United States Patent
Kawaguchi et al.

(10) Patent No.: US 7,211,285 B2
(45) Date of Patent: May 1, 2007

(54) COMPOSITION FOR RETAINING AND DEVELOPING THE FLAVOR OF A FOOD OR DRINK

(75) Inventors: Hirokazu Kawaguchi, Kawasaki (JP); Hidehiko Wakabayashi, Kawasaki (JP); Masanori Kohmura, Kawasaki (JP); Mika Uda, Kawasaki (JP); Yasushi Nishimura, Kawasaki (JP); Yoichi Ueda, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 160 days.

(21) Appl. No.: 10/344,409

(22) PCT Filed: Sep. 7, 2001

(86) PCT No.: PCT/JP01/07769

§ 371 (c)(1),
(2), (4) Date: Jul. 17, 2003

(87) PCT Pub. No.: WO02/21938

PCT Pub. Date: Mar. 21, 2002

(65) Prior Publication Data

US 2004/0028787 A1    Feb. 12, 2004

(30) Foreign Application Priority Data

Sep. 14, 2000 (JP) .............................. 2000-280451
Sep. 14, 2000 (JP) .............................. 2000-280611
Apr. 16, 2001 (JP) .............................. 2001-116509
Apr. 16, 2001 (JP) .............................. 2001-116510

(51) Int. Cl.
*A23L 2/56* (2006.01)

(52) U.S. Cl. .................................................... 426/537

(58) Field of Classification Search ................ 426/533, 426/534, 535, 537
See application file for complete search history.

(56) References Cited

U.S. PATENT DOCUMENTS 3,617,310 A * 11/1971 Rizzi ........................ 426/535
3,681,088 A *  8/1972 Elberon et al. ............. 426/535
3,821,421 A *  6/1974 Begemann et al. .......... 426/96
4,161,550 A *  7/1979 Bernhardt et al. .......... 426/533

FOREIGN PATENT DOCUMENTS

| EP | 1 069 116 | 1/2001 |
| GB | 1 383 082 | 2/1975 |
| JP | 46-3273 | 10/1971 |
| JP | 49-42859 | 4/1974 |

OTHER PUBLICATIONS

"Foodstuff with flavor precursor", Research Disclosure, No. 179018, XP002325345.

* cited by examiner

*Primary Examiner*—Arthur L. Corbin
(74) *Attorney, Agent, or Firm*—Oblon, Spivak, McClelland, Maier & Neustadt, P.C.

(57) ABSTRACT

In the present application are disclosed a method for enhancing or improving the flavor of foods or drinks in general with the use of a non-volatile thiazolidine compound alone or a non-volatile flavor compound and/or a reaction flavor concurrently with the non-volatile thiazolidine compound, a simple and effective method for improving the flavor of a retort food by suppressing the flavor-deterioration upon heat sterilization or the unpleasant odor at the time of eating, and a simple and effective method for improving the flavor of a soybean-incorporated food product by suppressing the unpleasant, weed-like odor peculiar to soybean.

9 Claims, 6 Drawing Sheets

Comparison of stability between glutathione and cysteine

COMPOSITION FOR RETAINING AND DEVELOPING THE FLAVOR OF A FOOD OR DRINK

TECHNICAL FIELD

The present invention relates to a composition for retaining and developing the flavor of foods, which composition is useful in the technology for enhancing the good flavor of food or drink products and developing the good flavor stably over a long time period in the field of foods and drinks and the like.

The present invention relates also to a new thiazolidine compound which is useful in the technology for enhancing the good flavor of food or drink products and developing the good flavor stably over a long time period in the field of foods and drinks and the like.

Furthermore, the present invention provides a method for obtaining foods or drinks whose palatability has been enhanced by suppressing or masking the unpleasant odor of foods or drinks or imparting favorable flavors to foods or drinks, by retaining the flavors of foods or drinks stably and developing the flavors at the time of eating or drinking.

The present invention also provides a method for obtaining frozen foods whose palatability has been enhanced by suppressing or masking the unpleasant odor of frozen foods or imparting favorable flavors to frozen foods, by retaining the flavors of frozen foods stably and developing the flavors at the time of eating.

The present invention relates to a method for improving the flavor of, inter alia, a retort food by suppressing or masking its peculiar unpleasant odor with the use of a non-volatile thiazolidine compound.

Furthermore, the present invention relates also to a method for improving the flavor of, inter alia, a processed soybean-incorporated food product by suppressing or masking its soybean-peculiar unpleasant odor with the use of a non-volatile thiazolidine compound.

BACKGROUND ART

It is very important in the production of food products to retain good flavors of just-made foods or drinks until they are eaten or drunk, and develop the good flavors when necessary.

However, in the actual food industries, the flavors inherent in such products as seasonings, processed foods or the like may be weakened or lost by such operations as concentration, drying or the like during the production process of the products. Meanwhile, flavors unfavorable to commercial products may develop during the production process or distribution channel. Under the circumstances, a technology for enhancing good flavors of food or drink products and developing the good flavors stably over a long time period has been strongly desired.

Meanwhile, a number of studies have been so far made on the technology for controlling the retention and development of aromas ("Latest Technology for Food Flavors", issued by Kougyo Gijyutsukai in 1988). For example, encapsulation of aromas in microcapsules, confinement of aromas in matrices, inclusion of aromas by cyclodextrin or the like, action of enzymes on volatile aroma constituent precursors such as glycosides are known.

However, there are problems, e.g., in a method of physically retaining aromas, it is difficult to control its amount of development at will, whereas in a method using glycosides, it has such problems that the target compounds are limited only to alcohols and that enzymes used are deactivated in a system heated for using the enzymes.

Further, as to processed foods, the flavors inherent in the products may be weakened or lost by such operations as concentration, drying or the like during the production process of the products.

Meanwhile, sulfur-containing compounds which are aroma substances generally has a low aroma threshold and often play an important role in aroma characteristics for perfume cosmetics, food products and the like. For example, it is known that fran-derivative thiol compounds (such as 2-Furylmethanethiol (FMT) and 2-Methyl-3-furanthiol (MFT) and the like) greatly contribute to the aromatizing of foods including coffees and livestock meats ("Sulfur Compounds in Foods", ACS Symposium Series 564, American Chemical Society (1994)). However, since these thiol compounds have a low threshold, it is difficult to retain the development amount of their aroma within a proper range and to retain their aroma concentration within a predetermined range over a long time period. Therefore, a method for retaining or developing the aroma effectively has been expected to be developed.

It is very important, as has been described, in the production of food products to retain good flavors of just-made foods or drinks until they are eaten or drunk and develop the good flavors when necessary.

However, in the actual food industries, flavors are gradually volatilized and weakened or lost, or degraded or turned into unpleasant odors during each step of production, distribution, storage, and the like. Under these circumstances, a technology for enhancing good flavors of food or drink products and developing the good flavors stably over a long time period has been strongly desired.

Meanwhile, as has been also described, a number of studies have been so far made on the technology for controlling the retention and development of aromas ("Latest Technology for Food Flavors", issued by Kougyo Gijyutsukai in 1988). For example, encapsulation of aromas in microcapsules, confinement of aromas in matrices, inclusion of aromas by cyclodextrin or the like, action of enzymes on volatile aroma constituent precursors such as glycosides are known.

Further, as a method for preventing the volatilization of aroma components, there have been proposed, e.g., a method in which an aroma material is dissolved in a solvent material which can dissolve the aroma component of the aroma material and which has a higher boiling point than the sublimation and/or volatilization temperature of the aroma component, and then the resulting mixture is mixed into foods or perfume cosmetics (Japanese Patent Application Laid-Open No. 50084/1999), a method of blending polylysine or a salt thereof as active ingredients (Japanese Patent Application Laid-Open No. 30712/1994), and a method of adding a whey protein or a derivative thereof to foods or drinks; and for the purpose of enhanced storage stability of aromas, there have been proposed a method of sealing or confining an aroma component within carbohydrate(s), as exemplified by a sorbitol-encapsulated flavor obtained by sealing or confining a flavor within a molten mixture of sorbitol, mannitol and saccharine (Japanese Patent Application Laid-Open No. 71866/1983), a composite flavor having a flavor contained in xylitol (Japanese Patent Application Laid-Open No. 76062/1983), and the like.

As for a method for suppressing unpleasant odors of foods or drinks, there have been practiced, as measures for preventing the deterioration of aromas by oxygen, the development of a container or bag made of a synthetic resin having a reduced oxygen permeability, the introduction of a food production process comprising deoxygenation operations, the addition of antioxidants, and the like. As measures for preventing the deterioration of aromas by light, there have been proposed a milk-containing acidic drink to which rutin, morin or quercetin has been added for the purposes of preventing the occurrence of substances causing unpleasant odors and/or tastes and improving preservability (Japanese Patent Publication No. 21450/1992); a method of preventing the deterioration of flavors by sunshine by using chlorogenic acid, caffeic acid or ferulic acid which are derived from the extracts from raw coffee beans, and vitamin C, rutin or quercetin in combination (Japanese Patent Application Laid-Open No. 27374/1992); and a method of preventing the deterioration of a natural aroma material by adding chlorogenic acid derived from coffee beans to a aroma composition derived from a natural material (Japanese Patent Application Laid-Open No. 345693/1992). Further, as measures for suppressing the deterioration of flavors by light, heat or oxygen, a method wherein a specific flavone derivative is used (Japanese Patent Application Laid-Open No. 169148/1999) has been proposed.

Meanwhile, it has heretofore been well known that a variety of thiols are widely distributed as aroma components in a variety of food products. The thiols include those which are contained in naturally occurring materials such as vegetable essential oil and the like as well as those which are produced secondarily by heat treatment, enzyme reaction or the like at the time of processing. These have the problem that the aromas inherent in such thiols are lost by heat treatment at the time of food processing such as sterilization treatment and the like or by long-time preservation, and it is thought that the problem is caused by the decomposition, deterioration or volatilization of the thiols by heat. In Japanese Patent Application Laid-Open No. 281697/2000 disclosed is a method in which when a thiol compound exhibiting an aroma is used in the form of a glycoside, the stability of the thiol compound against the heat or the like applied during the production process of food products is increased, while the aroma inherent in the thiol is also exhibited as the glycoside is gradually decomposed due to the influences of heat and/or pH, whereby the aroma can be prolonged although the thiol compound is used in low concentrations due to a low threshold. However, the method does not have the function of developing aroma at the time of eating foods and is therefore different from the present invention described below in greater detail.

The background art concerning frozen foods is as follows:

Conventionally, when a component having a strong aroma volatility is to be incorporated into frozen foods, an essential oil-like component is added as it is or the component in the form of a powder obtained by causing dextrin or the like to adsorb the component and powdering the resulting product, is added. According to this method, however, it is difficult to cause a sufficient amount of the component to remain in an end product since most of the component is volatilized under severe heating conditions such as frying or the like. Further, since the volatilization of the component added proceeds gradually during frozen preservation, measures such as sealing with the use of a gas-impermeable packaging materials, or the like, must be taken.

Further, there has been proposed a frozen food which contains an oil-like aroma volatile component encapsulated in capsules whereby the aroma volatile component remains in an sufficient amount in the end product even after the product has undergone a heating operation (Japanese Patent Application Laid-Open No. 014332/2000), and there has been also proposed a composition containing an amino acid, reducing sugar, protein and water as a topping composition for a microwave oven which topping composition is capable of giving favorable browning and/or roasted savor to foods by microwave cooking (Japanese Patent Application Laid-Open No. 103790/1999).

Further, the background art concerning retort foods is as follows:

As is well known, retort foods include so-called "retort pouch foods" (in the narrow sense) produced by filling with food material, a bag-shaped container (pouch) made of a light-shielding plastic film obtained by laminating an aluminum foil or a transparent plastic film having a low oxygen permeability, sealing the opening of the container by heat sealing and subjecting the container to commercial heat sterilization at temperatures higher than 100° C. by using a pressurized sterilizer (retort) as well as canned foods and bottled foods (in the broad sense). Since the retort foods can be preserved over a long time period at room temperature, they are widely used due to convenience thereof.

However, since retort foods are produced by being subjected to heat treatment at high temperatures (retort treatment), a so-called "retort odor" which is an unpleasant odor may be produced. This has been considered unfavorable from the viewpoint of product quality.

Substances causing the unpleasant odor (to be sometimes referred to as "retort odor" hereinafter) are not yet identified.

To alleviate the retort odor, the easing of conditions for heat sterilization and the like have heretofore been studied. However, in order to distribute retort foods at ordinary temperature, they must be sterilized at high temperatures to some extent, and the easing of the conditions for heat sterilization is limited as an operation for preventing the deterioration of flavors.

Further, there have been proposed a method in which a gas-impermeable package is used as the package for retort foods (Japanese Patent Application Laid-Open No. 29845/1992) and a method in which the inside of the package is substituted with a nitrogen gas at the time of sterilizing the retort food (Japanese Patent Application Laid-Open No. 254167/1986). In addition, a method in which cyclodextrin is added at the time of producing retort foods (Japanese Patent Application Laid-Open No. 75366/1985), a method in which sucrose fatty acid ester is added at the time of producing retort foods (Japanese Patent Application Laid-Open No. 17407/1982) have also been considered.

However, the improvement in the package and the substitution with nitrogen increase costs, since the existing packaging materials and filling equipment must be altered accordingly. Meanwhile, satisfactory results have not been obtained by the method using cyclodextrin or sucrose fatty acid ester.

Thus, the development of a simple and effective method for suppressing or masking the retort odor whereby the flavor of retort foods is improved, has been desired.

Furthermore, the background art concerning soybean-incorporated or -utilized food products is as follows:

Soybean protein may be mentioned as a typical example of soybean-incorporated or -utilized food products. The soybean protein which is a vegetable protein, is used not only as a major edible protein source but also in a variety of food processings by taking advantage of its characteristics and is expected to be used more and more in the future along with increasing consciousness in health.

However, although soybean protein is excellent from the viewpoint of its nutritive value and functionalities such as emulsifying property and the like, it is limited in many cases when it is used as an ingredient or raw material of food, since it has a unique taste, smell, color and the like. Further, it is known that the unique taste and smell are greatly attributable to the lipid moiety remaining in the soybean protein. In other words, unsaturated fatty acids such as linoleic acid, linolenic acid and the like cause oxidation due to enzymatic or non-enzymatic factors and are converted into carbonyl compounds or the like typified by aldehydes such as hexanol, and the like, and it is said that these substances are attributable to the taste and smell peculiar to defatted soy milk, isolated soybean protein, or the like.

Therefore, for removing or alleviating the unpleasant odor peculiar to soybean protein, a number of studies have heretofore been made. There are known, for example, methods such as enzyme treatment, microorganism treatment, activated carbon treatment,. thermo-vacuum treatment and the like (Wolf, W. J.: J.Agric.Food Chem., 23, 136(1975), Ryuzo Sasaki, Hideo Chiba; Chemistry and organism, 21, 536(1983), Warner, K., Mounts, T. L., Rackis, J. J. and Wolf, W. J.; Cereal Chem., 60, 102(1982) and so on). Further, as a simple method, a method in which a variety of masking agents are added has also been studied.

Further, a method in which a solution containing soybean protein is brought into contact with a weak-basic anion-exchange resin, an amphoteric ion-exchange resin or a functional group-free synthetic adsorption resin to remove the "soybean odor" peculiar. to soybeans which is called "bean-like odor" or "weed-like odor", has also been studied (Japanese Patent Application Laid-Open No. 276955/1994).

However, the above methods such as enzyme treatment, microorganism treatment, activated carbon treatment, thermo-vacuum treatment, ion-exchange resin treatment and the like have not yet succeeded in removing the unpleasant odor, that is, soybean smell, completely. In addition, these treatments make the process complicated and increase costs, and are therefore accompanied with some problems to be solved with regard to actual applications. Further, the above-described method of adding masking agents exhibits some effects, but it is basically not for removing the soybean smell. Therefore, the method has the problem that it can not be applied when soybean protein is used as the main ingredient in high concentrations and its amount to be used is restricted.

DISCLOSURE OF THE INVENTION

Under the background of the above-described prior art, it is an object of the present invention to provide an excellent composition comprising, as the effective ingredient, a non-volatile thiazolidine compound for retaining and developing the flavor, which composition can be used in the field of foods and drinks and the like for enhancing the good flavor of food or drink products, and retaining stably and developing the good flavor over a long time period (a first object of the present invention).

Under the background of the above-described prior art, it is another object of the present invention to provide an excellent substance for retaining and developing the flavor, which substance can be used in the field of foods and drinks and the like for enhancing the good flavor of food or drink products, and retaining stably and developing the good flavor over a long time period, said substance being a novel non-volatile thiazolidine compound (a second object of the present invention).

Under the background of the above prior art, it is still another object of the present invention to provide foods or drinks whose palatability has been enhanced by suppressing or masking the unpleasant odor of foods or drinks and/or imparting favorable flavors to foods or drinks, with the concurrent use of a non-volatile flavor compound (described later) in addition to a non-volatile thiazolidine compound, whereby the flavors of foods or drinks can be stably retained and developed at the time of eating or drinking (a third object of the present invention).

Furthermore, under the background of the above prior art, it is an object of the present invention to provide frozen foods whose palatability has been enhanced by suppressing or masking the unpleasant odor of frozen foods and/or imparting favorable flavors to frozen foods, with the concurrent use of a non-volatile flavor compound in addition to a non-volatile thiazolidine compound, whereby the flavors of frozen foods can be stably retained and developed at the time of eating (a fourth object of the present invention).

Under the background of the above prior art, it is another object of the present invention to provide a simple and effective method for suppressing the deterioration of the flavor of a retort food at the time of heat-sterilizing the retort food, with the use of a non-volatile thiazolidine compound, whereby the unpleasant retort odor of the retort food can be suppressed and the flavor of the retort food can be improved at the time of eating the retort food, and a retort food which has been produced by such method and whose flavor is improved by suppressing the retort odor (a fifth embodiment of the present invention). In this case, the concurrent use of a non-volatile flavor compound and/or a reaction flavor in addition to a non-volatile thiazolidine compound can give a favorable aroma to, and mask the unpleasant odor of, the retort food.

Under the background of the above prior art, it is still another object of the present invention to provide a simple and effective method for suppressing the unpleasant, weed-like odor peculiar to soybeans, of the soybean-incorporated or -utilized food product, whereby the flavor of a soybean-incorporated or -utilized food product can be improved, and a soybean-incorporated or -utilized food product which has been produced by such method and whose flavor is improved by suppressing the unpleasant odor (a sixth embodiment of the present invention). In this case, the concurrent use of a non-volatile flavor compound and/or a reaction flavor in addition to a non-volatile thiazolidine compound can give a favorable aroma to, and mask the unpleasant odor of, the soybean-incorporated or -utilized food product.

Now, first, a first embodiment of the present invention intended for the purpose of attaining the above-described first object of the present invention will be described in greater detail.

The present inventors have made intensive studies to achieve the object and found (a) that if a thiazolidine compound is caused to coexist in a food or drink in a concentration of 0.1 to 10,000 ppm, preferably 1 to 1,000 ppm, at the time of eating or drinking, the flavor inherent in the food or drink is enhanced, and the flavor components are retained stably over a long time period, whereby the favorable flavor can be retained until the food or drink is eaten or drunk, (b) that when the above compound is allowed to exist in a processed food or the like, the flavor of the product can be prevented from becoming weakened or disappearing, (c) that since the enhancement of the flavor with the use of the above compound is accompanied with an effect of sustained release, the concentration of the active flavor component can be maintained within a given proper range over a long time period, and (d) that since the above compound itself is an odorless substance having a slight acid taste, it can be applied to a wide variety of foods and drinks without impairing the flavor inherent in the foods or drinks to which the compound has been added. The present embodiment has been completed based on these findings.

Accordingly, the present embodiment relates to a composition for retaining and developing the flavor of a food or drink which composition comprises a non-volatile thiazolidine compound as the active ingredient; a method of producing a food or drink which comprises adding or using such composition; and a food or drink containing such composition, which food or drink has been produced by the production method.

Incidentally, the mechanism of retaining and developing the flavor by a thiazolidine compound according to the present embodiment is considered as follows.

That is, as shown in the following formula (1), a non-volatile thiazolidine compound (a) produces a 2-aminoethanethiol derivative (b) by an equilibrium reaction.

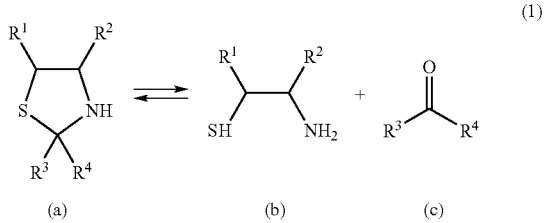

(1)

wherein $R^1$, $R^2$, $R^3$ and $R^4$ independently represent a hydrogen atom or a functional group bonded to the thiazolidine ring skeleton via carbon atom, as exemplified by an alkyl group, aryl group, carboxyl group or a proton.

The compound (b) produced by the equilibrium reaction cuts reductively the sulfide bonds present in a food or drink by the reducibility of its thiol group. As a result, the potentially aromatic thiol present in the form where two molecules of an aromatic thiol are disulfide-bonded or where an aromatic thiol disulfide-bonded to a non-volatile thiol such as cysteine, releases the aromatic thiol, and the released thiol develops and enhances the aroma. Further, the compound (b) produced by the above reaction produces further aroma components when its thiol group undergoes a further chemical change by heating or the like. Meanwhile, as the thiol compound (b) once produced or released from the thiazolidine compound (a) by the equilibrium reaction disappears by cutting disulfide bonds reductively or undergoing other chemical changes, it is newly produced little by little. Therefore, its effect can be maintained over a long time period, whereby the aroma components of foods or drinks which have been added with the thiazolidine compound, can be retained stably over a long time period, and the aroma components can be maintained in a proper developing amount over a long time period until the food or drink is eaten or drunk.

Further, the non-volatile thiazolidine compound according to the present embodiment can control the developing amount of aroma components by changing its amount to be added to a food or drink.

Furthermore, an aroma thiol compound itself is liable to be oxidized, and thiol compounds present in a food or drink (including raw materials thereof) is also liable to disappear during distribution or preservation of the food or drink. On the other hand, the thiazolidine compound according to the present embodiment has an excellent stability as compared with the thiol compound (refer to Example 3 to be described later) and is very advantageously added to and used in a food or the like.

Next, a second embodiment of the present invention intended for the purpose of attaining the above-described second object of the present invention will be described in greater detail.

The present inventors have made further intensive studies to achieve the object and found, as is similar to what has been described above in connection with the first embodiment of the present invention, (a) that if a new specific thiazolidine derivative (novel thiazolidine compound) is caused to coexist in a food or drink in a concentration of 0.1 to 10,000 ppm, preferably 1 to 1,000 ppm, at the time of eating or drinking, the flavor inherent in the food or drink is enhanced, and the flavor components are retained stably over a long time period, whereby the favorable flavor can be retained until the food or drink is eaten or drunk, (b) that when the above compound is allowed to exist in a processed food or the like, the flavor of the product can be prevented from becoming weakened or disappearing, (c) that since the enhancement of the flavor with the use of the above compound is accompanied with an effect of sustained release, the concentration of the active flavor component can be maintained within a given proper range over a long time period, and (d) that since the above compound itself is an odorless substance having a slight acid taste, it can be applied to a wide range of foods and drinks without impairing the flavor inherent in the foods or drinks to which the compound has been added. The present invention has been completed based on these findings.

Accordingly, the present embodiment relates to a novel thiazolidine compound which is an organic compound represented by the following general formula (2) in which R is a group having the same structure as that of the residual group obtained by removing an oxygen atom from the aldehyde group of an aldose or aldose-type oligosaccharide or that of the residual group obtained by removing an oxygen atom from the carbonyl group of a ketose or ketose-type oligosaccharide, and salts thereof.

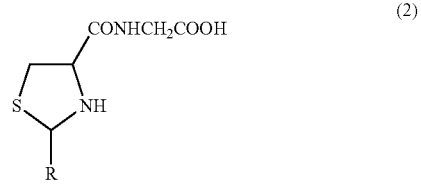

(2)

Incidentally, it is to be noted that the novel thiazolidine compounds are covered by the non-volatile thiazolidine compounds described above in connection with the first embodiment of the present invention.

Additionally, the mechanism of retaining and developing the flavor by the novel thiazolidine compounds of the present embodiment is considered to be the same as that by the non-volatile th-iazolidine compounds described above in connection with the first embodiment of the present invention, and is as follows.

That is, as shown in the following formula (3), a novel thiazolidine compound (a) produces cysteinylglycine (b) by an equilibrium reaction.

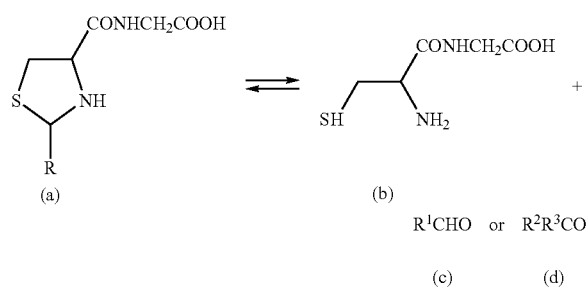

(3)

(a) (b)

R¹CHO or R²R³CO (c) (d)

The cysteinylglycine (b) produced by the equilibrium reaction cuts reductively the sulfide bonds present in a food or drink by the reducibility of its thiol group. As a result, the potentially aromatic thiol present in the form where two molecules of an aromatic thiol are disulfide-bonded or where an aromatic thiol disulfide-bonded to a non-volatile thiol such as cysteine, releases the aromatic thiol, and the released thiol develops and enhances the aroma. Further, the cysteinylglycine (b) produced by the above reaction produces further aroma components when its thiol group undergoes a further chemical change by heating or the like. Meanwhile, as the cysteinylglycine (b) (a thiol compound) once produced or released from the thiazolidine compound (a) by the equilibrium reaction disappears by cutting disulfide bonds reductively or undergoing other chemical changes, it is newly produced little by little. Therefore, its effect can be maintained over a long time period, whereby the aroma components of foods or drinks which have been added with the thiazolidine compound, can be retained stably over a long time period, and the aroma components can be maintained in a proper developing amount over a long time period until the food or drink is eaten or drunk. Incidentally, in the above formula (3), the compounds (c) and (d) represent an aldose-type oligosaccharide and a ketose or ketose-type oligosaccharide, respectively.

Further, the novel thiazolidine compounds according to the present embodiment can control the developing amount of aroma components by changing its amount to be added to a food or drink.

Furthermore, an aroma thiol compound itself is liable to be oxidized, and thiol compounds present in a food or drink (including raw materials thereof) is also liable to disappear during distribution or preservation of the food or drink. On the other hand, the novel thiazolidine compounds according to the present embodiment naturally has an excellent stability as compared with the thiol compound and is very advantageously added to and used in a food or the like, because the novel thiazolidine compounds are covered by the non-volatile thiazolidine compounds, as has been described above.

A third embodiment of the present invention intended for the purpose of attaining the above-described third object of the present invention will be described below.

The present inventors have made intensive studies to achieve the above object and found that the concurrent use of a flavor compound where an aromatic thiol (volatile flavor compound) is disulfide-bonded to a non-volatile thiol compound such as cysteine or the like, the flavor compound being referred to as "non-volatile flavor compound" in the present specification, in addition to a non-volatile thiazolidine compound described above in connection with the first embodiment of the present invention, enhances the effects of the first embodiment of the present invention. The present embodiment has been completed based on these findings. In greater detail, they have found that when a non-volatile thiazolidine compound is caused to be present in a food or drink in a concentration of 0.1 to 10,000 ppm, preferably 1 to 1,000 ppm at the time of eating or drinking, and a non-volatile flavor compound is concurrently caused to be present in the food or drink in a concentration of 0.1 to 10,000 ppb, preferably 1 to 1,000 ppb at the time of eating or drinking, the flavor of the food or drink is enhanced and the flavor components are retained stably over a long time period, whereby the favorable flavor can be retained until the food or drink is eaten or drunk, and the favorable flavor can be developed at the time of eating or drinking the food or drink, and whereby the unpleasant odor of the food or drink can be suppressed, thereby improving the palatability of the food or drink. The present embodiment has been completed based on these findings.

Accordingly, the present embodiment relates to a composition for retaining and developing the flavor of foods or drinks which composition comprises a non-volatile thiazolidine compound in an amount of 1–10,000 ppm and a non-volatile flavor compound and/or a reaction flavor in an amount of 1–10,000 ppb, both amounts being at the time of eating or drinking, a method of producing a food or drink with the use of such composition, and the food or drink which has been produced by such method.

Incidentally, the above thiazolidine compound and the above flavor compound can be in the form of raw materials containing these compounds, such as seasonings, extracts, and the like.

A fourth embodiment of the present invention intended for the purpose of attaining the above-described fourth object of the present invention will be described below.

The present inventors have made intensive studies to achieve the above object and found that the concurrent use of a non-volatile flavor compound described above, in addition to a non-volatile thiazolidine compound described above in connection with the first embodiment of the present invention, enhances the effects of the first embodiment of the present invention. The present embodiment has been completed based on these findings. In greater detail, they have found, as is similar to what has been described above in connection with the third embodiment of the present invention, that when a non-volatile thiazolidine compound is caused to be present in a frozen food in a concentration of 0.1 to 10,000 ppm, preferably 1 to 1,000 ppm at the time of eating, and a non-volatile flavor compound is concurrently caused to be present in the frozen food in a concentration of 0.1 to 10,000 ppb, preferably 1 to 1,000 ppb at the time of eating, the flavor of the frozen food is enhanced and the flavor components are retained stably over a long time period, whereby the favorable flavor can be retained until the frozen food is eaten, and the favorable flavor can be developed at the time of eating the frozen food, and whereby the unpleasant odor of the frozen food can be suppressed, thereby improving the palatability of the frozen food. The present embodiment has been completed based on these findings.

Accordingly, the present embodiment relates to a composition for retaining and developing the flavor of frozen foods which composition comprises a non-volatile thiazolidine compound in an amount of 1–10,000 ppm and a non-volatile flavor compound and/or a reaction flavor in an amount of 1–10,000 ppb, both amounts being at the time of eating, a method of producing a frozen food with the use of such composition, and the frozen food which has been produced by such method.

Incidentally, the above-described thiazolidine compound and the above-described non-volatile flavor compound can be in the form of raw materials containing these compounds, such as seasonings, extracts, and the like, as is the same as in the third embodiment of the present invention.

A fifth embodiment of the present invention intended for the purpose of attaining the above-described fifth object of the present invention will be described below.

The present inventors have made intensive studies to achieve the above object and found that when a non-volatile thiazolidine compound described above in connection with the first embodiment of the present invention, is added before heat sterilization during the production process of a retort food or at the time of opening the package of a retort food to cook or eat it, the unpleasant odor of the retort food can be suppressed easily and effectively. The present embodiment has been completed based on these findings.

Accordingly, the present embodiment relates to a method for improving the flavor of a retort food, in which a non-volatile thiazolidine compound is added to the retort food, whereby the unpleasant odor of the retort food can be suppressed.

The details of the mechanism how the retort odor can be suppressed by the method of the present embodiment remain to be elucidated. However, the present inventors assume at present that the added non-volatile thiazolidine compound reacts with aldehydes and/or ketones which are thought to be one of the causes of the retort odor, and makes them non-volatile, whereby the retort odor is suppressed.

A sixth embodiment of the present invention intended for the purpose of attaining the above-described sixth object of the present invention will be described below.

The present inventors have made intensive studies to achieve the above object and found that when a non-volatile thiazolidine compound described above in connection with the first embodiment of the present invention, is added to a soybean-incorporated food product (or soybean-utilized food product) either before or during the processing of its raw materials or at the time of cooking or eating a soybean-incorporated food product, the unpleasant odor of the soybean-incorporated food product can be suppressed easily and effectively. The present embodiment has been completed based on these findings.

Accordingly, the present embodiment relates to a method for improving the flavor of a soybean-incorporated food product, in which a non-volatile thiazolidine compound is added to the soybean-incorporated food product to suppress the unpleasant, weed-like odor peculiar to the soybean-incorporated food product.

Now, the embodiments of the present invention will be successively described below in more detail.

First, the first embodiment of the present invention will be described in more detail hereinafter.

By the non-volatile thiazolidine compound according to the present embodiment is meant a non-volatile thiazolidine derivative having at least one substituent on the thiazolidine skeleton. Illustrative examples of the thiazolidine compound include thioproline and derivatives thereof and 2-(polyhydroxyalkyl)thiazolidine-4-carboxylic acids. Specific examples thereof include 2-(1,2,3-trihydroxypropyl)thiazolidine-4-carboxylic acid, 2-(1,2,3,4-tetrahydroxybutyl)thiazolidine-4-carboxylic acid, 2-(1,2,3,4,5-pentahydroxypentyl)thiazolidine-4-carboxylic acid, 2-hydroxymethyl-2-(1,2,3,4-tetrahydroxybutyl) thiazolidine-4-carboxylic acid, 2-(1,2,4,5-tetrahydroxy-3-glucopyranosyloxypentyl) thiazolidine-4-carboxylic acid, and the like. There may be mentioned, as further examples thereof, 2-(1,2,3,4-tetrahydroxybutyl) thiazolidine-4-carbonyl-N-glycine and 2-(1,2,3,4,5-pentahydroxypentyl)thiazolidine-4-carbonyl-N-glycine, as referred to above in connection with the second embodiment of the present invention.

These thiazolidine compounds can be obtained by an ordinary method in which cysteine and an aldehyde are reacted with each other in an aqueous solution under neutral to alkaline conditions.

Next, a description will be given to a method for preparing the composition of the present embodiment for retaining and developing the flavor of a food or drink.

The preparation of the composition of the present embodiment is not particularly limited except that a non-volatile thiazolidine compound is contained as the active ingredient. As such a thiazolidine compound, a commercially available or synthetic thiazolidine compound can be used. Further, if possible, a natural substance containing the thiazolidine compound or a synthetic reaction mixture of thiazolidine may also be used as it is.

Its form is also not particularly limited, and it can be formed into appropriate forms such as powders, granules, liquid, paste and the like with or without using an excipient or diluent, regarded as appropriate. This includes a variety of seasonings containing the composition.

And, foods and drinks whose flavor is to be retained and developed with the use of a composition of the present embodiment for retaining and developing flavors, are not particularly limited, insofar as they can exhibit the effects intended by using a composition of the present embodiment for retaining and developing flavors, when the composition is used or added. As examples of such foods and drinks, there may be mentioned soups such as a consommé soup, corn soup, soup for Chinese noodles, and the like, powdery seasonings such as flavoring seasonings and the like, liquid seasonings such as soup stocks, dipping sauces for foods served in the hot pot, dipping sauces for Japanese noodles and the like, cup noodles, beverages such as coffee, and processed meat products such as hamburgers, meat balls, and the like. Various frozen foods may be also mentioned.

Next, a description will be given to a method for retaining and developing the flavor of a food or drink with the use of the composition of the present embodiment for retaining and developing the flavor.

As could be understood from the above-described mechanism how flavors are retained and developed with a thiazolidine compound according to the present embodiment, the point is that the effect of retaining and developing the flavor can be exhibited when the thiazolidine compound contained in a composition of the present invention, coexists with other flavor components at the time of eating or drinking. Therefore, the timing and method of adding the composition, the form of the composition to be added, and the like can be selected from a wide range. Concerning the amount to be added, the composition is added in such an amount that it ensures that the desired effect can be exhibited with the thiazolidine compound. For example, in the case of a chicken consommé soup, the composition is preferably added or used at a concentration of 1 to 1,000 ppm at the time of eating.

Finally, a description will be given to the distribution of the composition of the present embodiment for retaining and developing the flavor of a food or drink.

The composition of the present embodiment can be distributed as it is or in the form of seasonings obtained by mixing the composition with other flavor components. Further, it can also be distributed in the form of a processed food produced by using the composition of the present invention.

Secondly, the second embodiment of the present invention will be described in more detail hereinafter.

First, the novel compounds per se of the present embodiment will be described.

In the above general formula (2) representing the novel thiazolidine compounds of the present embodiment, R is the same in structure as the residual group obtained by removing an oxygen atom from the aldehyde group of an aldose or aldose-type oligosaccharide or the residual group obtained by removing an oxygen atom from the carbonyl group of a ketose or ketose-type oligosaccharide. Suitable examples of the aldose when the novel thiazolidine compound of the present embodiment is used in food products include aldopentoses such as xylose, ribose and the like; and aldohexoses such as glucose, galactose, mannose and the like. Meanwhile, by the aldose-type oligosaccharide is meant an oligosaccharide having an aldehyde group, and the polymerization degree of the oligosaccharide is preferably about 2 to 5 when the novel thiazolidine compound of the present invention is used in food products. Illustrative examples of such an aldose-type oligosaccharide include maltose, lactose, cellobiose and the like. Further, illustrative examples of the ketose include fructose.

Next, the synthetic method of the novel thiazolidine compounds of the present embodiment will be described.

The novel thiazolidine compounds of the present embodiment can be obtained, e.g., by an ordinary method in which cysteinylglycine is reacted with an aldose or aldose-type oligosacohride, or a ketose or a ketose-type oligosacohride in an aqueous solution under neutral to alkaline conditions.

Next, a description will be given to a method for preparing the composition of the present embodiment for retaining and developing the flavor of a food or drink. This is the same as has been described above in connection with the first embodiment of the present invention.

I.e., the preparation of the composition of the present embodiment is not particularly limited except that a novel thiazolidine compound of the present embodiment is contained as the active ingredient. Such a novel thiazolidine compound can be obtained, as has been described above, by a per se ordinary method. Further, if possible, a synthetic reaction mixture of thiazolidine containing the thiazolidine compound, may also be used as it is.

Moreover, its form is also not particularly limited, and it can be formed into appropriate forms such as powders, granules, liquid, paste and the like, with or without using an excipient or diluent, regarded as appropriate. This includes a variety of seasonings containing the compound.

Next, a description will be given to a method for retaining and developing the flavor of a food or drink with the use of the composition of the present embodiment for retaining and developing the flavor. This is the same as has been described above in connection with the first embodiment of the present invention.

I.e., as could be understood from the above-described mechanism how flavors are retained and developed with a thiazolidine compound according to the present embodiment, the point is that the effect of retaining and developing the flavor can be exhibited when the thiazolidine compound contained in a composition of the present embodiment, coexists with other flavor components at the time of eating or drinking. Therefore, the timing and method of adding the composition, the form of the composition to be added, and the like can be selected from a wide range. Concerning the amount to be added, the composition is added in such an amount that it ensures that the desired effect can be exhibited with the thiazolidine compound. For example, in the case of a beef consommé soup, the composition is preferably added or used at a concentration of 1 to 1,000 ppm at the time of eating.

Finally, a description will be given to the distribution of the composition of the present embodiment for retaining and developing the flavor of a food or drink. This is also the same as has been described above in connection with the first embodiment of the present invention.

I.e., the composition of the present embodiment can be distributed as it is or in the form of seasonings obtained by mixing the composition with other flavor components. Further, it can also be distributed in the form of a processed food produced by using the composition of the present embodiment.

In the third place, the third embodiment of the present invention will be described in more detail.

The non-volatile thiazolidine according to this embodiment of the present invention is the same as has been described above in connection with the first and second embodiments of the present invention.

By the non-volatile flavor compound according to the present embodiment is meant, as has been described, a compound stabilized by the formation of the disulfide bond between an aromatic thiol (volatile flavor compound) and a non-volatile thiol. Illustrative examples of the aromatic thiol (volatile flavor compound) include, e.g., 2-furylmethanethiol (FMT), 2-methyl-3-furanthiol (MFT), 2-(1-mercaptoethyl)furan (MEF), and the like. Illustrative examples of the non-volatile thiol include cysteine, glutathione, and the like.

Illustrative examples of the food and drink according to the present embodiment include soups such as a consommé soup, corn soup, soup for Chinese noodles, and the like, powdery seasonings such as flavoring seasonings and the like, liquid seasonings such as soup stocks, dipping sauces for foods served in the hot pot, dipping sauces for Japanese noodles, and the like, cup noodles, beverages such as coffee, and processed meat products such as hamburgers, meat balls, and the like.

The thiazolidine compound is added in an amount of 0.1 to 10,000 ppm, preferably 1 to 1,000 ppm, based on the weight of the food or drink, and the non-volatile flavor compound in which an aromatic thiol (volatile flavor compound) is disulfide-bonded to a non-volatile thiol such as cysteine or the like is added in an amount of 0.1 to 10,000 ppb, preferably 1 to 1,000 ppb, based on the weight of the food or drink, the amounts being at the time of eating or drinking.

The non-volatile thiazolidine compound and the non-volatile flavor compound may be added by any means such as powder mixing, liquid mixing or the like.

The effect has been observed when the non-volatile thiazolidine compound and the non-volatile flavor compound have been added either at the time of producing and processing the food or drink or at the time of eating the food or drink.

In the fourth place, the fourth embodiment of the present invention will be described in more detail.

The non-volatile thiazolidine compound according to the present embodiment is the same as has been described in connection with the first and second embodiments of the present invention.

The non-volatile flavor compound according to the present embodiment is the same as has been described above in connection with the third embodiment of the present invention.

Illustrative examples of the frozen foods according to the present embodiment include processed meat products such as hamburgers, croquettes, Chinese dumpling with minced pork and vegetable stuffing (gyoza), steamed Chinese pork dumpling wrapped in a thin flour-and-water pancake (shamai), and the like; fried shrimps; processed rice products such as baked rice balls, pilafs, Chinese fried rice (with eggs, shrimps, etc.), and the like; gratins; pizzas; Chinese noodles; curry rice; ingredients in Chinese-flavored rice served in a bowl; and the like.

The thiazolidine compound is added in an amount of 0.1 to 10,000 ppm, preferably 1 to 1,000 ppm, based on the weight of the frozen food, and the non-volatile flavor compound is added in an amount of 0.1 to 10,000 ppb, preferably 1 to 1,000 ppb, based on the weight of the frozen food, the amounts being at the time of eating.

The non-volatile thiazolidine compound and the non-volatile flavor compound may be added by any means such as powder mixing, liquid mixing or the like. This is the same as has been described above in connection with the third embodiment of the present invention.

The effect has been observed when the non-volatile thiazolidine compound and the non-volatile flavor compound have been added either at the time of producing and processing the frozen food or at the time of eating the frozen food. This is also the same as has been described above in connection with the third embodiment of the present invention.

In the fifth place, the fifth embodiment of the present invention will be described in more detail.

The non-volatile thiazolidine compound according to the present embodiment is all the same as has been described in connection with the first and second embodiments of the present invention.

There may be mentioned as illustrative examples of the retort foods according to the present embodiment, sauces such as meat sauce, white sauce, demigrass sauce, and the like; liquid-type mixed seasonings; stews; soups; curries; rice porridges; processed meat products such as hamburgers, meat balls, and the like; processed seafood products such as steamed fish pastes, mackerels cooked with fermented soybean pastes, and the like, all of which are packaged in heat-resistant packages (retort packages or containers) such as retort pouches, cans, bottles, and the like.

The amount of the non-volatile thiazolidine compound is not particularly limited as the desired effect of the present embodiment can be exhibited. For example, in the case of foods such as meat sauce, white sauce, curry, or the like, the non-volatile thiazolidine compound is added in such amount that it is a amount of 1 to 10,000 ppm, preferably 10 to 1,000 ppm, at the time of eating or drinking, based on its weight, to raw food materials to be retort treated. The raw food materials added with the non-volatile thiazolidine compound is charged and sealed in, e.g., a retort pouch, and is subjected to heat sterilization (retort treatment).

The non-volatile thiazolidine compound may be added by any means such as powder mixing, liquid mixing, or the like.

As regards the timing of adding or using the non-volatile thiazolidine compound, the effect of suppressing the retort odor has been observed when the non-volatile thiazolidine compound is added either before the raw materials of a retort food are subjected to heat sterilization (retort treatment) during the production process of the retort food, at the time of opening the retort package to cook it after the heat sterilization (retort treatment), or at the time of opening the retort package to eat or drink it. However, in consideration of the primary object of heating a retort food, i.e., sterilization, and the degree of the effect of suppressing the retort odor at the time of eating or drinking the retort food, the non-volatile thiazolidine compound is the most suitably added to the raw materials of the retort food before the raw materials are subjected to heat sterilization during the production process of the retort food.

Incidentally, a disulfide compound (non-volatile flavor compound) such as MFT-Cys (a disulfide of 2-methyl-3-franthiol with cysteine, i.e., 2-methyl-3-franthiol crysteine disulfide) or the like, a reaction flavor, or the like, can of course be concurrently used, in addition to the non-volatile thiazolidine compound according to the present embodiment.

The retort food is preferably heat-sterilized at temperatures of about 100 to 130° C. for several minutes to several tens of minutes. However, the temperature, the pressure and time for the heat sterilization are not particularly limited as long as the effect of the retort treatment can be achieved, and the retort treatment can be carried out in accordance with an ordinary method.

Finally, the sixth embodiment of the present invention will be described in more detail.

The non-volatile thiazolidine compound according to the present embodiment is all the same as has been described in connection with the first and second embodiments of the present invention.

There may be mentioned as illustrative examples of the soybean-incorporated or -utilized food products according to the present embodiment, soybean curds, bean curd refuses, soybean milk, soybean proteins, and food products using soybean protein or aqueous solution thereof, such as hams, sausages, hamburgers and the like. Moreover, soybean oils extracted from soybeans, and the like, may be mentioned.

The amount of the non-volatile thiazolidine compound is not particularly limited as long as the desired effect of the present embodiment can be exhibited. For example, in the case of soybean milk, the non-volatile thiazolidine compound is added thereto in an amount of 1 to 10,000 ppm, preferably 10 to 1,000 ppm, based on its weight. Also, in the case of soybean protein, the non-volatile thiazolidine compound is added thereto in an amount of 1 to 10,000 ppm, preferably 10 to 1,000 ppm, based on its weight.

The non-volatile thiazolidine compound may be added by any means such as powder mixing, liquid mixing, or the like. This is the same as has been described in connection with the fifth embodiment of the present invention.

As regards the timing of adding or using the non-volatile thiazolidine compound, it is not particularly limited as long as the desired effect of the present embodiment can be exhibited. For example, in the case of a soybean protein-incorporated hamburger, the effect of suppressing the unpleasant odor can be observed when the non-volatile thiazolidine compound is added at the time of processing raw materials, e.g., preparing soybean proteins, or at the time of making a soybean-incorporated food product, e.g., cooking the soybean protein-incorporated hamburger by using the soybean proteins. The effect of suppressing the unpleasant odor can also be observed when the non-volatile thiazolidine compound is added at the time of eating soybean-incorporated food products such as soybean milk or bean curd refuses. However, in consideration of the degree of the effect of suppressing the soybean odor, the non-volatile thiazolidine compound is the most suitably added either before or while the raw materials are processed or when soybean-incorporated food products are made.

Further, it is needless to say that a disulfide compound (non-volatile flavor compound) such as MFT-Cys (a disulfide of 2-methyl-3-franthiol with cysteine, i.e., 2-methyl-3-franthiol crysteine disulfide) or the like, a reaction flavor, or the like, can be concurrently used, in addition to the non-volatile thiazolidine compound according to the present embodiment.

In the foregoing, the present invention has been divided into the six embodiments and each embodiment has been described. As can be seen from the foregoing, the non-volatile thiazolidine compound is used as the agent of enhancing or improving the flavors of foods or drinks in accordance with each embodiment. Therefore, the six embodiments of the present invention constitute a group of inventions so liked as to form a single general inventive concept, the concept being the identification of the non-volatile thiazolidine compound as a flavor enhancing or improving agent for foods and drinks.

BEST MODE FOR CARRYING OUT THE INVENTION

The present invention will be further described with reference to Examples.

First, Examples will be given concerning the first embodiment of the present invention.

EXAMPLE 1

Figure 1:
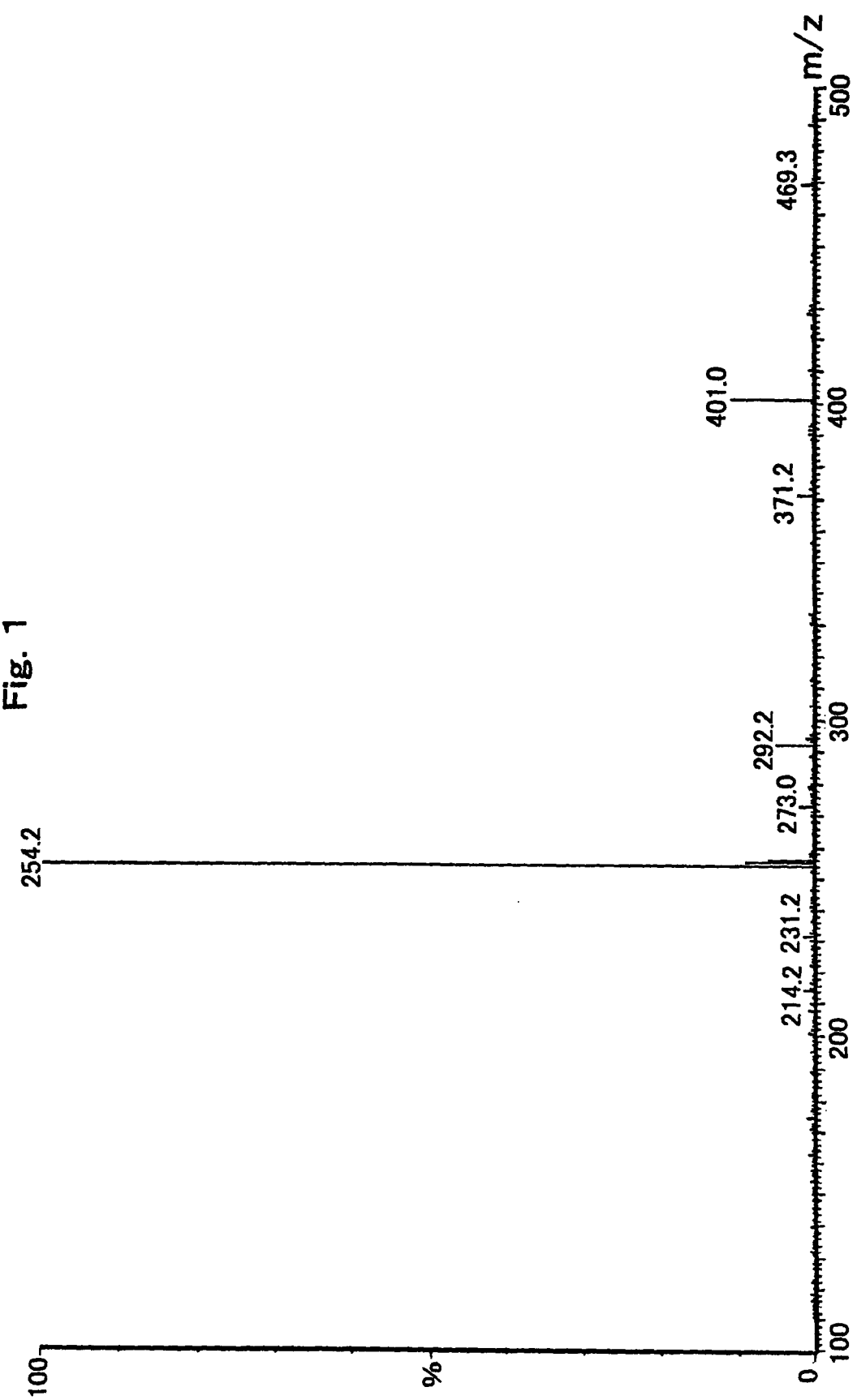
FIG. 1 shows an ESI-MS spectra indicating the formation of a thiazolidine compound according to the first embodiment of the present invention (Example 1).

Synthesis of 2-(1,2,3,4-Tetrahydroxy-butyl)Thiazolidine-4-Carboxylic acid 17.56 Grams (100 mmol) of cysteine hydrochloride and 15.01 g (100 mmol) of xylose were dissolved in 35 ml of pure water, 8.36 ml (100 mmol) of pyridine was then added thereto, and the resulting solution was stirred at room temperature for 72 hours. 300 Milliliters of ethanol was added to the stirred solution, and the solution was left to stand in a refrigerator, whereby a paste-like precipitate was formed. The solvent was removed by decantation, and the precipitate was dissolved in 100 ml of water. After the insoluble matters were removed by filtration, the remaining solution was condensed to about 30 ml. Ethanol was continuously added to the condensed solution until a precipitate was about to appear, and the solution was then left to stand in a refrigerator overnight. The resulting crystals were collected by filtration and dried under reduced pressure. The crystals were dissolved in water again, the insoluble matters were removed by filtration, the resulting solution was condensed, ethanol was added to the solution to cause recrystallization, and the produced crystals were collected by filtration and dried under reduced pressure to obtain 10.8 g of white powder (molar yield based on the cysteine: 42.7%). The white powder was identified as the target compound since the ion mass number of the white powder by ESI-MS spectrum (Electron Spray Ionization-Mass Spectrometry) was, as is shown in FIG. 1 given later, equal to the molecular weight (254) of the compound obtained by hydrogenating the target compound.

EXAMPLE 2

Figure 2:
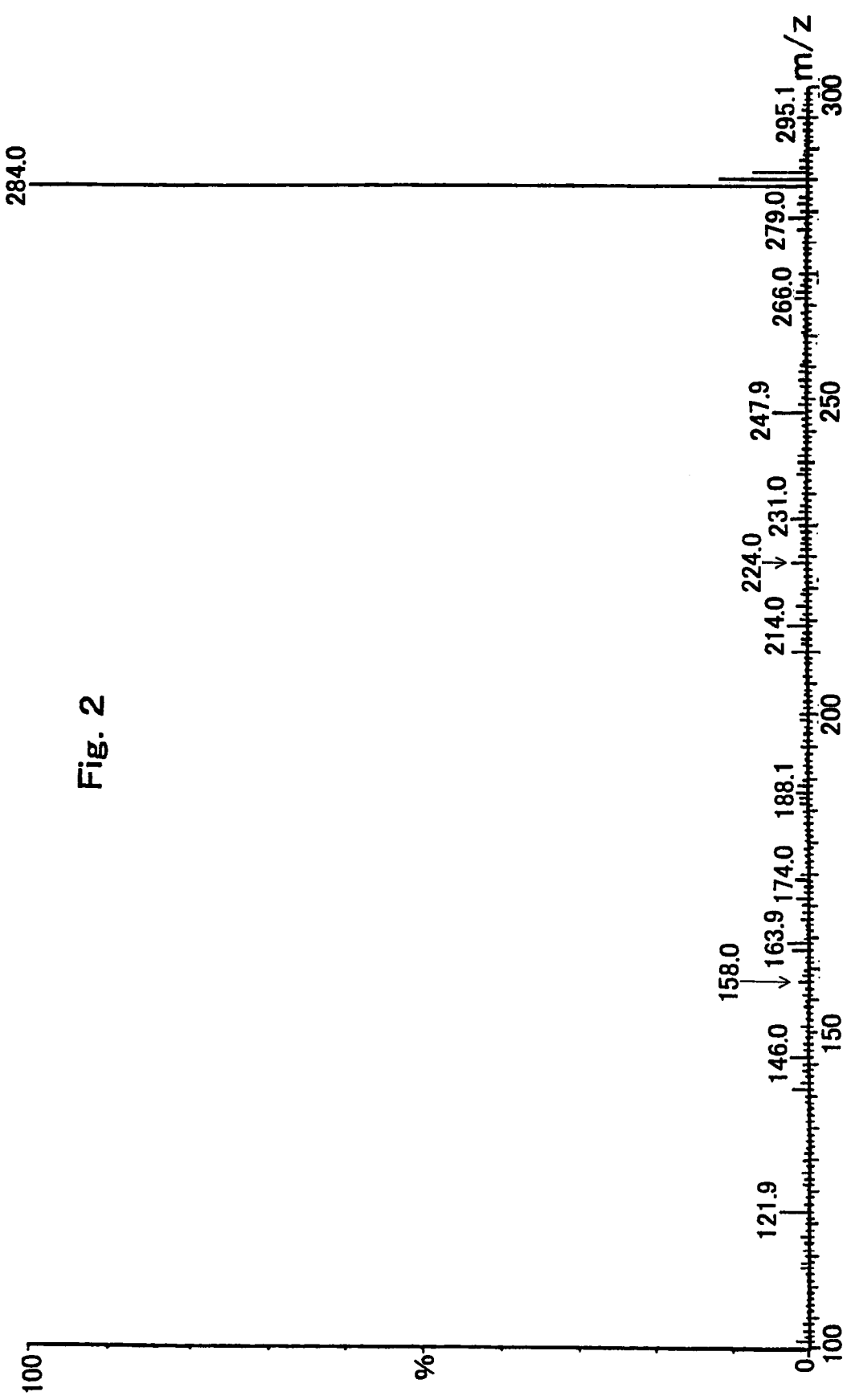
FIG. 2 shows an ESI-MS spectra indicating the formation of another thiazolidine compound according to the first embodiment of the present invention (Example 2).

Synthesis of 2-(1,2,3,4,5-Pentahydroxy-Pentyl) Thiazolidine-4-Carboxylic acid 17.56 Grams (100 mmol) of cysteine hydrochloride and 18.02 g (100 mmol) of glucose were dissolved in 35 ml of pure water, 8.36 ml (100 mmol) of pyridine was then added thereto, and the resulting solution was stirred at room temperature for 96 hours. 200 Milliliters of methanol was added to the stirred solution, whereby a precipitate was formed. The precipitate was collected by filtering and was suspended in 300 ml of water. The suspension was heated to 50° C. to give a solution. The solution was condensed to about 100 ml at 45° C. under reduced pressure. The insoluble matters were removed by filtration, and the remaining solution was, after added with 200 ml of methanol, left to stand in a refrigerator overnight. The resulting crystals were collected by filtration and dried under reduced pressure, whereby 15.0 g of a white powder was obtained (molar yield based on the cysteine: 52.9%). The white powder was identified as the target compound since the ion mass number of the white powder by ESI-MS spectrum (Electron Spray Ionization-Mass. Spectrometry) was, as is shown in FIG. 2 given later, equal to the molecular weight (284) of the compound obtained by hydrogenating the target compound.

EXAMPLE 3

Synthesis of 2-(1,2,4,5-Tetrahydroxy-3-Glucopyranosyloxypentyl) Thiazolidine-4-Carboxylic acid 17.56 Grams (100 mmol) of cysteine hydrochloride and 34.20 g (100 mmol) of maltose were dissolved in 35 ml of pure water, 8.36 ml (100 mmol) of pyridine was then added thereto, and the resulting solution was stirred at room temperature for 72 hours. 300 Milliliters of ethanol was added to the stirred solution, and the solution was left to stand in a refrigerator, whereby a paste-like precipitate was formed. The solvent was removed by decantation, and the precipitate was dissolved in 100 ml of water. After the insoluble matters were removed by filtration, the remaining solution was condensed to about 30 ml. Ethanol was continuously added to the condensed solution until a precipitate was about to appear, and the solution was then left to stand in a refrigerator overnight. The produced crystals were collected by filtration. The crystals were then dissolved in water again, the insoluble matters were removed by filtration, the resulting solution was condensed, and ethanol was added to the solution to cause recrystallization. The produced crystals were collected by filtration and dried under reduced pressure to obtain 2.2 g of a white powder (molar yield based on cysteine: 4.9%).

Figure 3:
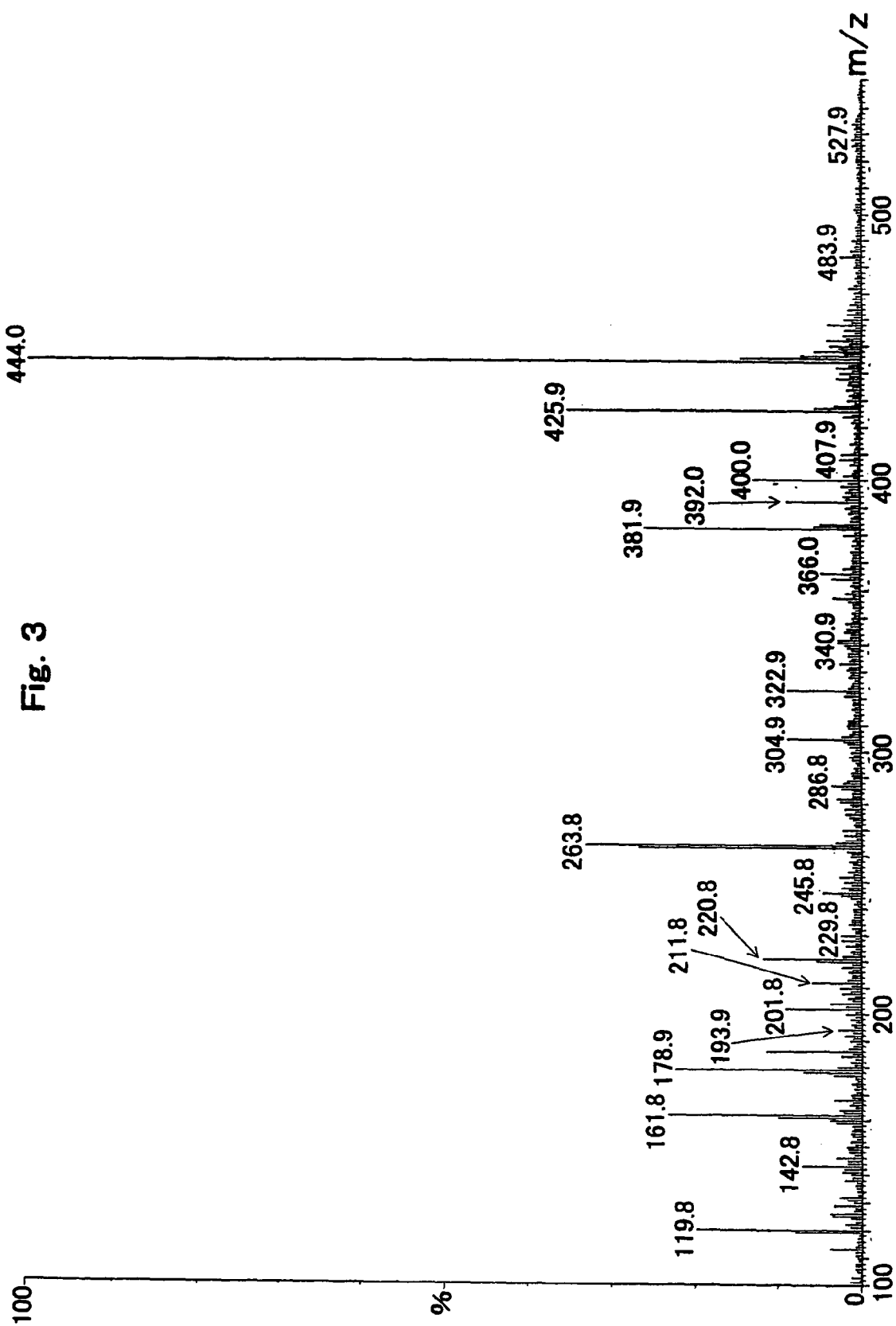
FIG. 3 shows an APCI-MS spectra indicating the formation of still another thiazolidine compound according to the first embodiment of the present invention (Example 3).

The white powder was identified as the target compound since the ion mass number of the white powder by APCI-MS (Atmospheric Pressure Chemical Ionization-Mass Spectrometry) spectrum was, as is shown in FIG. 3 given later, equal to the molecular weight (444) of the compound ([M-H]$^-$) obtained by dehydrogenating the target compound.

EXAMPLE 4

Figure 4:
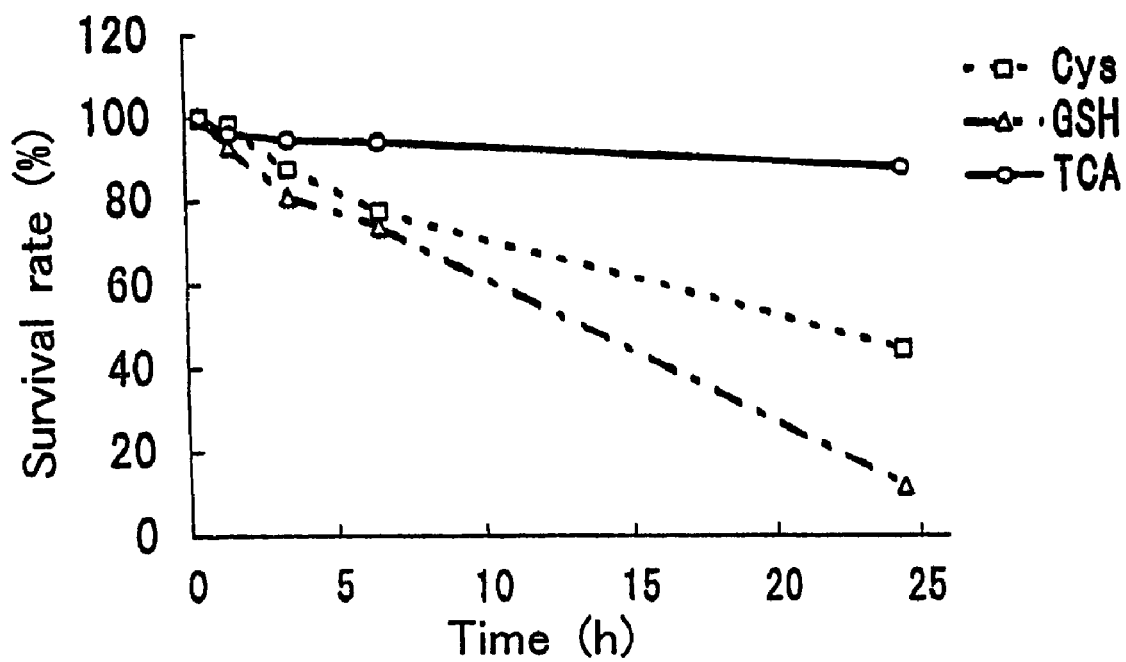
FIG. 4 shows the comparison of stability between glutathione and cysteine (Example 4).

Comparison of Stability between Glutathione and Cysteine 2-(1,2,3,4-tetrahydroxybutyl)thiazolidine-4-carboxylic acid (abbreviated as "TCA" hereinafter), one of the non-volatile thiazolidine compounds according to the present embodiment, glutathione (abbreviated as "GSH" hereinafter) and cysteine (abbreviated as "Cys" hereinafter) were each dissolved separately in 50 mM potassium phosphate solutions in such amount to give a concentration of 0.5 mM. The prepared solutions were each adjusted to a pH of 7.0 with an aqueous 1 N sodium hydroxide solution and then left to stand at room temperature (25° C.). A change with time in the survival rate of each component was measured by high-performance liquid chromatography. As a result, it is understood that the thiazolidine compound had better stability than the glutathione and the cysteine as shown in FIG. 4 given later.

EXAMPLE 5

Sensory Evaluation of Commercial Consommé Soup System (Part 1)

The non-volatile thiazolidine compound obtained as in Example 1 was added to a commercial chicken consommé soup in such amount that the concentration of the compound would be 0.07% when the soup was eaten. The commercial consommé soup added with the compound was compared and evaluated with the same commercial chicken consommé soup but not added with the compound, concerning the strength and preference of the flavors by a panel of six experts in accordance with the evaluation criteria attached to Table 1. As a result, as shown in Table 1, the soup added with the compound (Inventive) had a significantly stronger and more preferable flavor than the one but not added with the compound (Control).

TABLE 1

| Consommé Soup (Part 1) | |
| --- | --- |
| Evaluation Items | Average points of Inventive |
| Strength of Flavor | 1.0* |
| Preference of Flavor | 1.3* |

*Significant differences existed with a significant level of not higher than 5%.

<Evaluation criteria>
Rating  +2: Strong or preferable
        +1: Rather strong or rather preferable
         0: Non-different
        −1: Rather weak or rather non-preferable
        −2: Weak or non-preferable

EXAMPLE 6

Sensory Evaluation of Commercial Egg Soup System

The non-volatile thiazolidine compound obtained as in Example 1 was added to a commercial egg soup in such amount that the concentration of the compound would be 0.07% when the soup was eaten. The commercial egg soup added with the compound was compared with the same commercial egg soup but not added with the compound, and was evaluated concerning the strength and preference of the flavors by a panel of six experts in accordance with the evaluation criteria attached to the above Table 1. As a result, as is shown in the following Table 2, the soup added with the compound (Inventive) had a significantly stronger and more preferable flavor than the one not added with the compound (Control).

TABLE 2

| Egg Soup | |
| --- | --- |
| Evaluation Items | Average points of Inventive |
| Strength of Flavor | 1.0* |
| Preference of Flavor | 0.8* |

*Significant differences existed with a significant level of not higher than 5%.

EXAMPLE 7

Sensory Evaluation of Commercial Corn Soup System (Part 2)

The non-volatile thiazolidine compound obtained as in Example 1 was added to another commercial corn soup different from that of Example 5 in such amount that the concentration of the compound would be 0.07% when the soup was eaten. The commercial corn soup added with the compound was compared with the same commercial corn soup but not added with the compound, and was evaluated concerning the strength and preference of the flavors by a panel of six experts in accordance with the evaluation criteria attached to the above Table 1. As a result, as is shown in the following Table 3, the soup added with the compound (Inventive) had a significantly stronger and more preferable flavor than the one but not added with the compound (Control).

TABLE 3

| Consommé Soup (Part 2) | |
| --- | --- |
| Evaluation Items | Average points of Inventive |
| Strength of Flavor | 0.6* |
| Preference of Flavor | 1.0* |

*Significant differences existed with a significant level of not higher than 5%.

Next, the second embodiment of the present invention will be described in more detail with reference to Examples hereinafter.

EXAMPLE 8

Synthesis of a New Compound,
2-(1,2,3,4-Tetrahydroxybutyl)
Thiazolidine-4-Carbonyl-N-Glycine 100 Milligrams (0.56 mmol) of cystenylglycine (product of Sigma Co., Ltd.) and 84 mg (0.56 mmol) of xylose were dissolved in 0.2 ml of pure water, and 50 µl (0.59 mmol) of pyridine was added thereto. After the obtained solution was mixed well, it was left to stand at room temperature for 5 hours for reaction. When 2 ml of ethanol was added to the reaction solution and the resulting mixture was left to stand at 5° C. overnight, a white precipitate was formed. After the precipitate was collected with a centrifugal separator and washed with ethanol, it was dissolved in 0.2 ml of pure water and freeze-dried, whereby 94 mg of a white powder was obtained.

Figure 5:
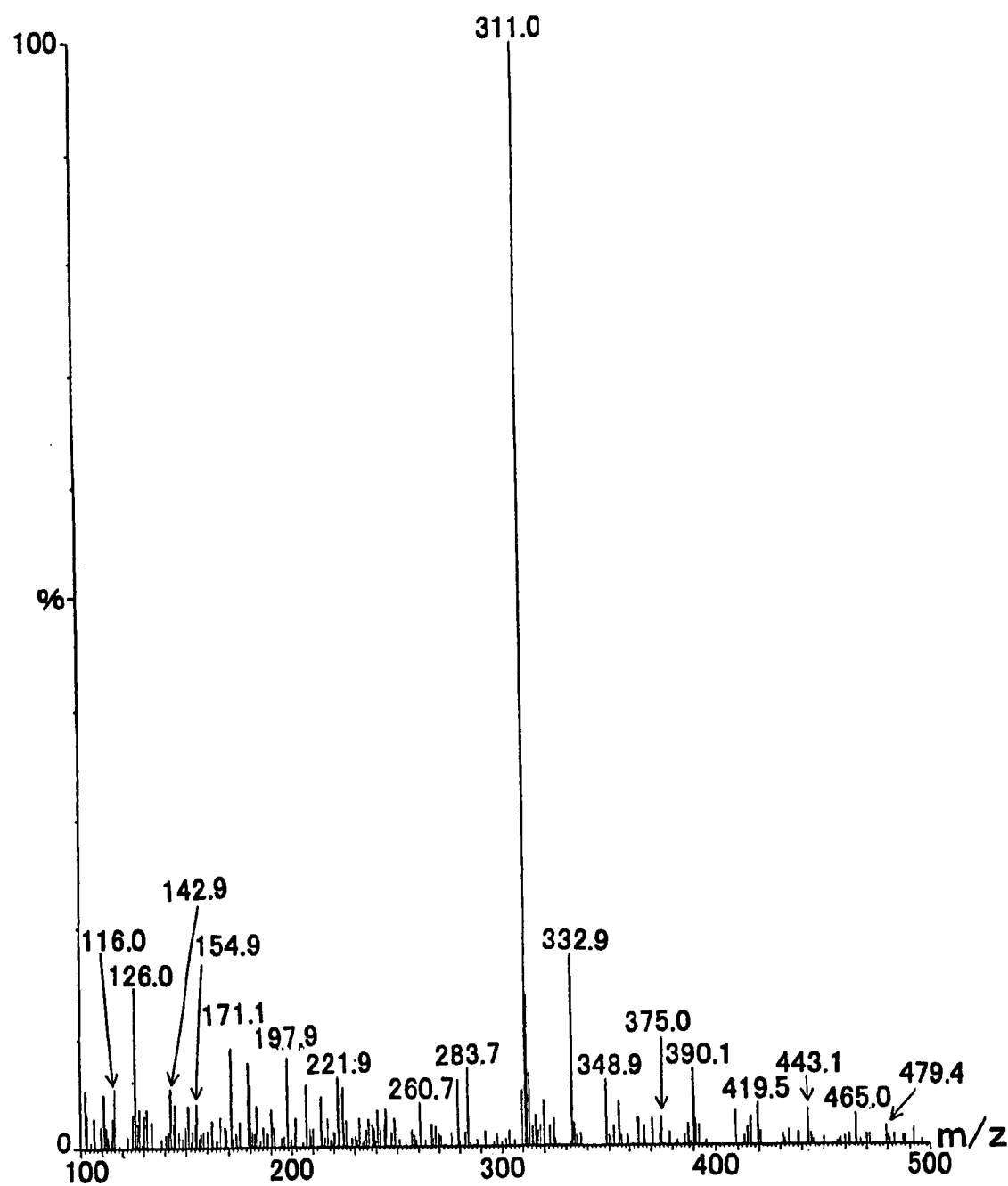
FIG. 5 shows an ESI-MS spectra of a novel thiazolidine compound according to the second embodiment of the present invention (Example 8).

The white powder was identified as the target compound since the ion mass number of the white powder by ESI-MS spectrum (Electron Spray Ionization-Mass Spectrometry) was, as is shown in FIG. 5 given later, equal to the molecular weight (311) of the compound obtained by hydrogenating the target compound.

EXAMPLE 9

Synthesis of a New Compound,
2-(1,2,3,4,5-Pentahydroxypentyl)
Thiazolidine-4-Carbonyl-N-Glycine 100 Milligrams (0.56 mmol) of cystenylglycine (product of Sigma Co., Ltd.) and 100 mg (0.56 mmol) of glucose were dissolved in 0.2 ml of pure water, and 50 µl (0.59 mmol) of pyridine was added thereto. After the obtained solution was mixed well, it was left to stand at room temperature for 5 hours for reaction. When 2 ml of ethanol was added to the reaction solution and the resulting mixture was left to stand at 5° C. overnight, a white precipitate was formed. After the precipitate was collected with a centrifugal separator and washed with ethanol, it was dissolved in 0.2 ml of pure water and freeze-dried, whereby 85 mg of a white powder was obtained.

Figure 6:
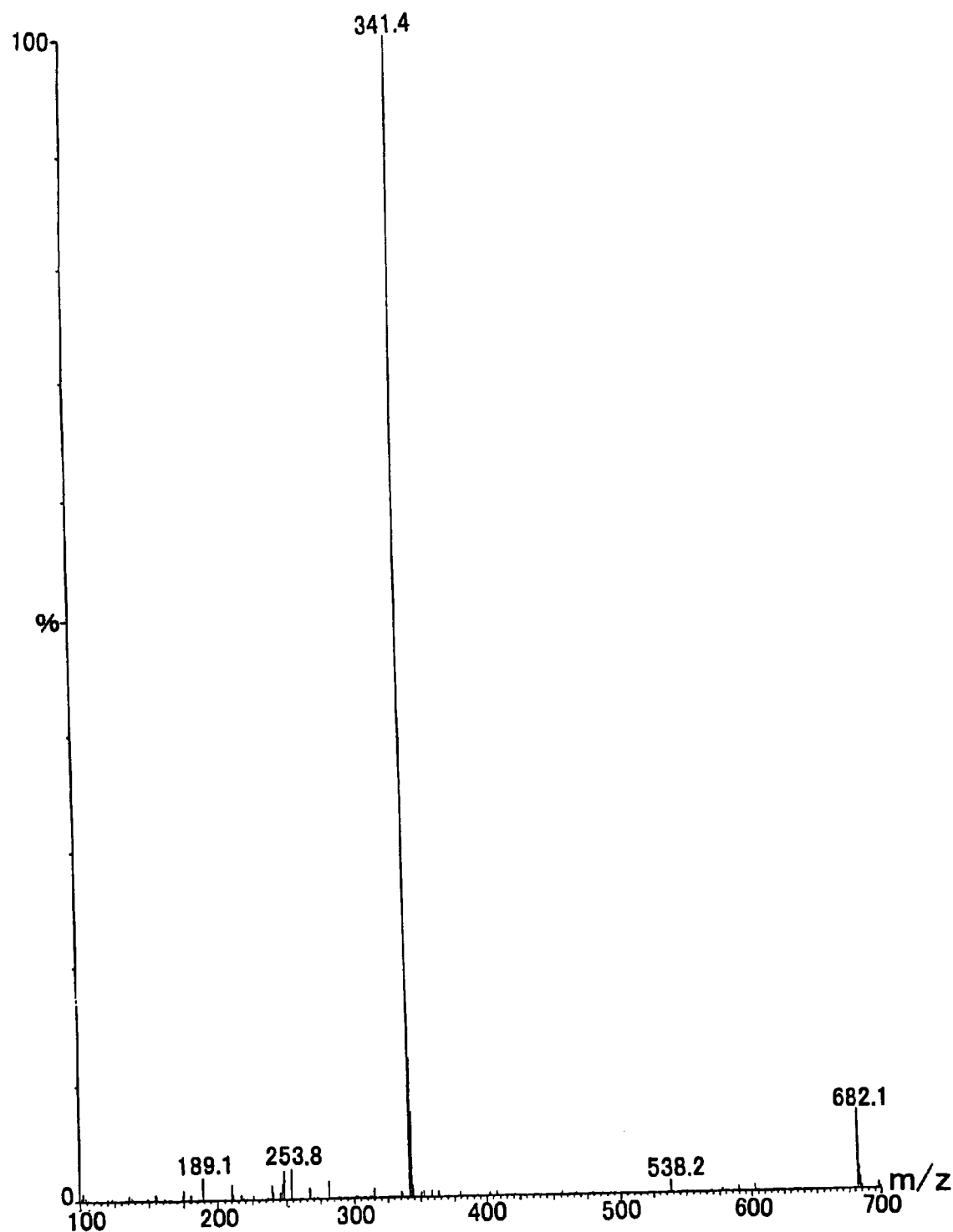
FIG. 6 shows an ESI-MS spectra of another novel thiazolidine compound according to the second embodiment of the present invention (Example 9).

The white powder was identified as the target compound since the ion mass number of the white powder by ESI-MS spectrum (Electron Spray Ionization-Mass Spectrometry) was, as is shown in FIG. 6 given later, equal to the molecular weight (341) of the compound obtained by hydrogenating the target compound.

EXAMPLE 10

Use for Beef Consommé Soup

The thiazolidine compound obtained in Example 8 was added to a commercial solid beef consommé (product of Knorr Foods Co., Ltd.) in such amount that the concentration of the compound would be 0.03% at the time of eating. The resulting solid beef consommé was dissolved in hot water to prepare a consommé soup. The consommé soup was, while maintained at 70° C. in an open system, compared with a consommé soup prepared from the same solid beef consommé but not added with the compound. The consommé soup added with the thiazolidine compound (Present invention) apparently had a stronger beef-like flavor than the consommé soup added with no thiazolidine compound (Control). In addition, even at a lapse of 1 hour after the preparation of the samples, the soup added with the thiazolidine compound still had a apparently stronger aroma than the soup added with no thiazolidine compound, and the thiazolidine compound was still in effect.

EXAMPLE 11

Use for Instant-Coffee

The thiazolidine compound obtained in Example 8 was added to commercial freeze-dried instant coffee in such amount that the concentration of the compound would be 0.01% when the coffee was drunk. The mixture was dissolved in hot water to prepare a hot coffee. The hot coffee was, while maintained at 70° C. in an open system, compared with a hot coffee added with no thiazolidine compound. The hot coffee added with the thiazolidine compound (Present invention) apparently had a stronger favorable coffee aroma than the hot coffee added with no thiazolidine compound (Control). In addition, even at a lapse of 30 minutes after the preparation of the samples, the hot coffee added with the thiazolidine compound still apparently had a stronger aroma than the hot coffee added with no thiazolidine compound, and the thiazolidine compound was still in effect.

In the third place, Examples will be given concerning the third embodiment of the present invention.

EXAMPLE 12

Synthesis of 2-(1,2,3,4-Tetrahydroxy-Butyl)
Thiazolidine-4-Carboxylic acid

Example 1 was repeated to obtain 2-(1,2,3,4-tetrahydroxybutyl) thiazolidine-4-carboxylic acid.

EXAMPLE 13

Synthesis of 2-Methyl-3-Franthiol Cysteine Disulfide (MFT-Cys)

2-Methyl-3-furylthiol (56 mg) was dissolved in N,N-dimethylformamide (400 µl), and this solution was dissolved in acetonitrile (20 ml) with stirring. Separately, 2 equivalents in terms of sodium hydroxide of an aqueous 27% sodium hydroxide solution was added to cystine (0.1 g), and the resulting solution and water (20 ml) were added to the above-mention solution and stirred. Cysteine (0.1 g) was added to the stirred solution, and the resulting mixture was allowed to react with stirring at room temperature for 2 days. After the reaction mixture was adjusted to a pH of 2, the resulting precipitate was filtered with a 0.45-µm filter followed by distilling out the acetonitrile. The condensed solution was then filtered with a 0.45-µm filter, then adjusted in its amount to about 15 ml followed by purifying by reversed-phase HPLC. The reversed-phase HPLC was carried out by using Inertsil ODS having a size of 20×250 mm of GL Science Co., Ltd. as a column, 0.1% formic acid as an eluant A and acetonitrile containing 0.1% formic acid as an eluant B, a gradient from 5%B to 40%B (20 minutes), and a flow rate of 10 ml/min, and detection was carried out at 254 nm. Fractions containing the target compound were collected and freeze-dried to obtain a brown powder in an amount of 11.0 mg (Yield: 9.6%).

EXAMPLE 14

Synthesis of 2-Furylmethanethiol Cysteine Disulfide (FFT-Cys)

2 Equivalents in terms of sodium hydroxide of an aqueous 27% sodium hydroxide solution and water (20 ml) were added to cystine (0.1 g) to give a solution. To the resulting solution were added 2-furylmethanethiol and MeOH (40 ml), and the resulting mixture was allowed to react with stirring at room temperature for 1 week. After the reaction mixture was adjusted to a pH of 2, the resulting precipitate was filtered followed by washing the precipitate with water and MeOH. The filtrate and washings were collected and condensed. The resulting precipitate was filtered off with a 0.45 μm filter, and the remainders were adjusted in its amount to about 8 ml followed by purifying by reversed-phase HPLC. The reversed-phase HPLC was carried out by using Inertsil ODS having a size of 20×250 mm of GL Science Co., Ltd. as a column, 0.1% formic acid as an eluant A and acetonitrile containing 0.1% formic acid as an eluant B, a gradient from 5%B to 40%B (20 minutes), and a flow rate of 10 ml/min. Detection was carried out at 210 nm. Fractions containing the target compound were collected and freeze-dried to obtain a white powder in an amount of 34.5 mg (Yield: 17.2%).

EXAMPLE 15

Synthesis of 2-(1-Mercaptoethyl)Furan Cysteine Disulfide (MEF-Cys)

100 Milligrams of cystine was dissolved in 50 ml of an aqueous 0.1 N sodium hydroxide solution, to which was added a solution of 41.8 mg of MEF dissolved in 10 ml of methanol. The mixture was stoppered tightly and allowed to stand at room temperature for 5 days. Thereafter, the solution was neutralized and washed with ether, followed by concentrating the aqueous layer to dryness with the use of a rotary evaporator. The dried mass was dissolved again in a small amount of water, followed by purifying with the use of a solid phase extracting column ("Bondelute C18" ex Varian). The methanol-eluted fractions were freeze-dried, whereby a white powder was obtained in an amount of 10 mg (Yield: 12.4%).

EXAMPLE 16

Sensory Evaluation of Commercial Chicken Consommé Soup System (Part 1)

The non-volatile thiazolidine compound obtained by the above Example 12 was added to 100 g of chicken consommé soup prepared by adding 600 ml of hot water to two cubes (14 g) of commercial chicken consommé (product of Knorr Foods Co., Ltd.) in such amount that the concentration of the compound would be 5 ppm when the soup was eaten. Sensory evaluations were made on the chicken consommé soup containing the non-volatile thiazolidine compound and a chicken consommé soup containing none of the non-volatile thiazolidine compound by a panel of five experts in accordance with the evaluation criteria attached to the following Table 4. As a result, as is shown in Table 4, the soup containing the non-volatile thiazolidine compound (Inventive) showed a significantly improved preference as compared with the one containing none of the non-volatile thiazolidine compound (Control).

TABLE 4

Sensory Evaluation of Chicken Consommé Soup (Part 1)

| Evaluation Items | Average Rating of Inventive |
|---|---|
| Strength of Odor of Degraded Chicken Fat | −1.20* |
| Preference of Aroma | +1.00* |
| Strength of Flavor of Meat | +0.40 |
| Overall Preference of Flavor | +1.00* |
| Overall Evaluation (0 to 10) | 6.20** |

*Significant differences existed with a significance level of not higher than 5%.
**Significant differences existed with a significance level of not higher than 1%.

<Evaluation criteria>
Rating +2: Strong or preferable
+1: Rather strong or rather preferable
0: Same as the one containing no non-volatile thiazolidine compound
−1: Rather weak or rather non-preferable
−2: Weak or non-preferable

EXAMPLE 17

Sensory Evaluation of Commercial Chicken Consommé Soup System (Part 2)

The non-volatile thiazolidine compound obtained in Example 12 and the MFT-Cys obtained in Example 13 were added to 100 g of the chicken consommé soup prepared by adding 600 ml of hot water to two cubes (14 g) of commercial chicken consommé (product of Knorr Foods Co., Ltd.) in such amount that the concentrations of the non-volatile thiazolidine compound and the MFT-Cys would be 5 ppm and 500 ppb, respectively, when the soup was eaten. Sensory evaluations were made on the chicken consommé soup containing both the non-volatile thiazolidine compound and MFT-Cys and a chicken consommé soup containing none of the thiazolidine compound and the MFT-Cys as the control by a panel of five experts in accordance with the evaluation criteria attached to the above Table 4. As a result, the soup containing both the non-volatile thiazolidine compound and the MFT-Cys (Inventive) had, as is shown in the following Table 5, a significantly improved preference as compared with the one containing neither the thiazolidine compound nor the MFT-Cys (Control).

TABLE 5

Sensory Evaluation of Chicken Consommé Soup (Part 2)

| Evaluation Items | Average Rating of Inventive |
|---|---|
| Strength of Aroma | +1.80** |
| Strength of Odor of Degraded Chicken Fat | −1.60** |
| Preference of Aroma | +1.40** |
| Strength of Flavor of Meat | +1.60** |
| Overall Preference of Flavor | +1.60** |
| Overall Evaluation (0 to 10) | 7.40** |

**Significant differences existed with a significance level of not higher than 1%.

EXAMPLE 18

Sensory Evaluation of Commercial Chicken Consommé Soup System (Part 3)

The non-volatile thiazolidine compound obtained in Example 12 and a commercial reaction flavor ("AROMATE MB", product of Ajinomoto Co., Inc.) were added to 100 g of chicken consommé soup prepared by adding 600 ml of hot water to two cubes (14 g) of commercial chicken consommé (product of Knorr Foods Co., Ltd.) in such amount that the concentrations of the non-volatile thiazolidine compound and the reaction flavor would be 5 ppm and 100 ppm, respectively, when the soup was eaten. Sensory evaluations were made on the chicken consommé soup containing both the non-volatile thiazolidine compound and reaction flavor and a chicken consommé soup containing none of the thiazolidine compound and "AROMATE MB" by a panel of five experts in accordance with the evaluation criteria attached to the above Table 4. As a result, as is shown in the following Table 6, the soup containing both the non-volatile thiazolidine compound and the reaction flavor (Inventive) had a significantly improved preference as compared with the one containing none of the thiazolidine compound and the reaction flavor (Control).

TABLE 6

Sensory Evaluation of Chicken Consommé Soup (Part 3)

| Evaluation Items | Average Rating of Inventive |
| --- | --- |
| Strength of Odor of Degraded Chicken Fat | −1.80** |
| Preference of Aroma | +1.60** |
| Strength of Flavor of Meat | +0.60** |
| Overall Preference of Flavor | +1.80** |
| Overall Evaluation (0 to 10) | 7.80** |

**Significant differences existed with a significance level of not higher than 1%.

EXAMPLE 19

Sensory Evaluation of Commercial Corn Cream Soup System (Part 1)

The non-volatile thiazolidine compound obtained in Example 12 was added to 100 g of a corn cream soup prepared by adding 450 ml of hot water to three bags (52 g) of commercial corn cream cup soup (product of Ajinomoto Co., Inc.) in such amount that the concentration of the non-volatile thiazolidine compound would be 5 ppm, when the soup was eaten. Sensory evaluations were made on the corn cream soup containing the non-volatile thiazolidine compound and a corn cream soup containing none of the non-volatile thiazolidine compound by a panel of five experts in accordance with the evaluation criteria attached to the above Table 4. As a result, as is shown in the following Table 7, the soup containing the non-volatile thiazolidine compound (Inventive) had a significantly improved preference as compared with the one containing none of the non-volatile thiazolidine compound (Control).

TABLE 7

Sensory Evaluation of Corn Cream Soup (Part 1)

| Evaluation Items | Average Rating of Inventive |
| --- | --- |
| Strength of Aroma | +0.60 |
| Preference of Aroma | +0.60 |
| Strength of Milk Flavor | +1.40** |
| Overall Preference of Flavor | +1.00* |
| Overall Evaluation (0 to 10) | 6.60* |

*Significant differences existed with a significance level of not higher than 5%.
**Significant differences existed with a significance level of not higher than 1%.

EXAMPLE 20

Sensory Evaluation of Commercial Corn Cream Soup System (Part 2)

The non-volatile thiazolidine compound obtained in Example 12 and the MEF-Cys obtained in Example 15 were added to 100 g of a corn cream soup prepared by adding 450 ml of hot water to three bags (52 g) of commercial corn cream cup soup (product of Ajinomoto Co., Inc.) in such amount that the concentrations of the non-volatile thiazolidine compound and the MEF-Cys would be 5 ppm and 100 ppb, respectively, when the soup was eaten. Sensory evaluations were made on the corn cream soup containing both the non-volatile thiazolidine compound and the MEF-Cys and a corn cream soup containing neither the non-volatile thiazolidine compound nor the MEF-Cys by a panel of five experts in accordance with the evaluation criteria attached to the above Table 4. As a result, as is shown in the following Table 8, the soup containing both the non-volatile thiazolidine compound and the MEF-Cys (Inventive) had a significantly improved preference as compared with the one containing neither the non-volatile thiazolidine compound nor the MEF-Cys (Control).

TABLE 8

Sensory Evaluation of Corn Cream Soup (Part 2)

| Evaluation Items | Average Rating of Inventive |
| --- | --- |
| Strength of Aroma | +1.40* |
| Strength of Aroma of Raw Corn | +1.00 |
| Preference of Aroma | +1.00 |
| Overall Preference of Flavor | +1.20 |
| Overall Evaluation (0 to 10) | 6.40 |

*Significant differences existed with a significance level of not higher than 5%.

EXAMPLE 21

Sensory Evaluation of Commercial Instant Miso Soup System (Part 1)

The non-volatile thiazolidine compound obtained in Example 12 was added to 100 g of miso soup prepared by adding 450 ml of hot water to three packages (63.6 g) of commercial instant miso soup "ASAGE" (product of Nagatanien Co., Ltd.) in such amount that the concentration of the non-volatile thiazolidine compound would be 100 ppm when the soup was eaten. Sensory evaluations were made on the miso soup containing the non-volatile thiazolidine compound and a miso soup containing none of the non-volatile thiazolidine compound by a panel of five experts in accordance with the evaluation criteria attached to the above Table 4. As a result, as is shown in the following Table 9, the soup containing the non-volatile thiazolidine compound (Inventive) had a significantly improved preference as compared with the one containing none of the non-volatile thiazolidine compound (Control).

TABLE 9

Sensory Evaluation of Miso Soup

| Evaluation Items | Average Rating of Inventive |
|---|---|
| Strength of Odor of Browned Bean Paste | −0.80* |
| Preference of Aroma | +1.00* |
| Strength of Flavor of dashi | +0.80 |
| Overall Preference of Flavor | +1.40** |
| Overall Evaluation (0 to 10) | 7.20** |

*Significant differences existed with a significance level of not higher than 5%.
**Significant differences existed with a significance level of not higher than 1%.

In the fourth place, Examples will be given concerning the fourth embodiment of present invention.

EXAMPLE 22

Synthesis of 2-(1,2,3,4-Tetrahydroxy-Butyl) Thiazolidine-4-Carboxylic acid

Example 1 was repeated to obtain 2-(1,2,3,4-tetrahydroxybutyl) thiazolidine-4-carboxylic acid.

EXAMPLE 23

Synthesis of 2-Methyl-3-Franthiol Cysteine Disulfide (MFT-Cys)

Example 13 was repeated to obtain 2-methyl-3-franthiol cysteine disulfide (MFT-Cys).

EXAMPLE 24

Synthesis of 2-Furylmethanethiol Cysteine Disulfide (FFT-Cys)

Example 14 was repeated to obtain 2-furylmethanethiol cysteine disulfide (FFT-Cys)

Example 25 Synthesis of 2-(1-mercaptoethyl)furan cysteine disulfide (MEF-Cys)

Example 15 was repeated to obtain 2-(1-mercaptoethyl) furan cysteine disulfide (MEF-Cys).

Example 26 Sensory Evaluation of Commercial Frozen Hamburger System (Part 1)

The non-volatile thiazolidine compound obtained by Example 22 was added to 20 g of a commercial frozen hamburger product (product of Nichirei Corporation) in such amount that the concentration of the non-volatile thiazolidine compound would be 20 ppm when the hamburger was eaten. After the frozen hamburger product was defrosted and heated with a microwave oven, sensory evaluations were made on the hamburger containing the non-volatile thiazolidine compound and a hamburger containing none of the non-volatile thiazolidine compound by a panel of five experts in accordance with the evaluation criteria attached to the following Table 10. As a result, as is shown in Table 10, the hamburger containing the non-volatile thiazolidine compound (Inventive) had a significantly improved preference as compared with the one containing none of the non-volatile thiazolidine compound (Control).

TABLE 10

Sensory Evaluation of Commercial Frozen Hamburger (Part 1)

| Evaluation Items | Average Rating of Inventive |
|---|---|
| Strength of Beast Odor Peculiar to Meat | −1.00* |
| Preference of Aroma | +0.80* |
| Strength of Flavor of Meat | +0.40 |
| Overall Preference of Flavor | +0.60 |
| Overall Evaluation (0 to 10) | 5.80 |

*Significant differences existed with a significance level of not higher than 5%.

<Evaluation criteria>
Rating +2: Strong or preferable
+1: Rather strong or rather preferable
0: Same as the control
−1: Rather weak or rather non-preferable
−2: Weak or non-preferable

EXAMPLE 27

Sensory Evaluation of Commercial Frozen Hamburger System (Part 2)

The non-volatile thiazolidine compound obtained by Example 22 and the MFT-Cys abtained by Example 23 were added to 20 g of a commercial frozen hamburger product (product of Nichirei Corporation) in such amount that the concentrations of the non-volatile thiazolidine compound and the MFT-Cys would be 20 ppm and 100 ppb, respectively, when the hamburger was eaten. Sensory evaluations were made on the hamburger containing both the non-volatile thiazolidine compound and the MFT-Cys and a hamburger containing none of the non-volatile thiazolidine compound and the MFT-Cys by a panel of five experts in accordance with the evaluation criteria attached to the above Table 10. As a result, as is shown in the following Table 11, the hamburger containing both the non-volatile thiazolidine compound and the MFT-Cys (Inventive) had a significantly improved preference as compared with the one containing none of the non-volatile thiazolidine compound and the MFT-Cys (Control).

TABLE 11

Sensory Evaluation of Commercial Frozen Hamburger (Part 2)

| Evaluation Items | Average Rating of Inventive |
|---|---|
| Strength of Aroma | +1.80** |
| Strength of Beast Odor Peculiar to Meat | −0.80 |
| Preference of Aroma | +1.40** |
| Strength of Flavor of Meat | +1.80** |
| Overall Preference of Flavor | +1.60* |
| Overall Evaluation (0 to 10) | 7.00** |

*Significant differences existed with a significance level of not higher than 5%.
**Significant differences existed with a significance level of not higher than 1%.

EXAMPLE 28

Sensory Evaluation of Commercial Frozen Hamburger System (Part 3)

The non-volatile thiazolidine compound obtained by Example 22 and the FFT-Cys abtained by Example 24 were added to 20 g of a commercial frozen hamburger product (product of Nichirei Corporation) in such amount that the concentrations of the non-volatile thiazolidine compound and the FFT-Cys would be 20 ppm and 100 ppb, respectively, when the hamburger was eaten. Sensory evaluations were made on the hamburger containing both the non-volatile thiazolidine compound and the FFT-Cys and a hamburger containing none of the thiazolidine compound and the FFT-Cys by a panel of five experts in accordance with the evaluation criteria attached to the above Table 10. As a result, as is shown in the following Table 12, the hamburger containing both the non-volatile thiazolidine compound and the FFT-Cys (Inventive) had a significantly improved preference as compared with the one containing neither the thiazokicine compound nor the FFT-Cys (Control).

TABLE 12

Sensory Evaluation of Commercial Frozen Hamburger (Part 3)

| Evaluation Items | Average Rating of Inventive |
|---|---|
| Strength of Aroma | +1.40* |
| Strength of Beast Odor Peculiar to Meat | −1.40* |
| Preference of Aroma | +1.40** |
| Strength of Flavor of Meat | +1.40** |
| Overall Preference of Flavor | +1.40** |
| Overall Evaluation (0 to 10) | 7.20** |

*Significant differences existed with a significance level of not higher than 5%.
**Significant differences existed with a significance level of not higher than 1%.

EXAMPLE 29

Sensory Evaluation of Commercial Frozen Hamburger System (Part 4)

The non-volatile thiazolidine compound obtained by Example 22 and a commercial reaction flavor "AROMATE MB" (product of Ajinomoto Co., Inc.) were added to 20 g of a commercial frozen hamburger product (product of Nichirei Corporation) in such amount that the concentrations of the non-volatile thiazolidine compound and the AROMATE MB would be 20 ppm and 100 ppm, respectively, when the hamburger was eaten. Sensory evaluations were made on the hamburger containing both the non-volatile thiazolidine compound and the AROMATE MB and a hamburger containing none of the thiazolidine compound and the AROMATE MB by a panel of five experts in accordance with the evaluation criteria attached to the above Table 10. As a result, as is shown in the following Table 13, the hamburger containing both the non-volatile thiazolidine compound and the AROMATE MB (Inventive) had a significantly improved preference as compared with the one containing neither the thiazolidine compound nor the AROMATE MB (Control).

TABLE 13

Sensory Evaluation of Commercial Frozen Hamburger (Part 4)

| Evaluation Items | Average Rating of Inventive |
|---|---|
| Strength of Aroma | +1.40* |
| Strength of Beast Odor Peculiar to Meat | −1.20 |
| Preference of Aroma | +1.60** |
| Strength of Flavor of Meat | +1.60** |
| Overall Preference of Flavor | +1.60* |
| Overall Evaluation (0 to 10) | 7.40** |

*Significant differences existed with a significance level of not higher than 5%.
**Significant differences existed with a significance level of not higher than 1%.

In the fifth place, Examples will be given concerning the fifth embodiment of the present invention.

EXAMPLE 30

Synthesis of 2-(1,2,3,4-Tetrahydroxy-Butyl) Thiazolidine-4-Carboxylic acid

Example 1 was repeated to obtain 2-(1,2,3,4-tetrahydroxybutyl) thiazolidine-4-carboxylic acid.

EXAMPLE 31

Meat Sauce 100 ppm of the non-volatile thiazolidine compound obtained in Example 30 was added to 120 g of the meat sauce prepared according to the recipe shown in the following Table 14. The resulting mixture was sealed in a retort pouch, and subjected to heat treatment at 123° C. for 15 minutes (retort treatment), whereby an inventive product was obtained. Further, for the sake of comparison, another meat sauce (control product) was prepared in the same manner except that the non-volatile thiazolidine compound was not used.

On the following day, the pouches containing the two types of meat sauces, respectively, were opened, and sensory evaluations were made on the two types of meat sauces by a panel of six experts. That is, when the product according to the present embodiment was compared with the control product, the strength of the retort odor of the product according to the present embodiment was rated on a scale of −2 to +2, while the preference of the aroma or flavor of the product according to the present embodiment was rated on a scale of +2 to −2, and the product according to the present embodiment was rated as 0 when the result of rating a particular item of the product according to the present embodiment was the same as that of the control product, and an average was calculated for each evaluation item. The results are shown in the following Table 15.

TABLE 14

Recipe of Meat Sauce

| Ingredients | Blending Ratio (g) |
|---|---|
| Minced Meat | 200 |
| Onion | 200 |
| Carrot | 100 |
| Celery | 100 |
| Garlic | 5 |
| Tomato Paste | 150 |
| Whole Tomato | 370 |
| Fond de Veau (commercial aseptic product) | 10 |
| Table Salt | 10 |

TABLE 14-continued

Recipe of Meat Sauce

| Ingredients | Blending Ratio (g) |
|---|---|
| Granulated Sugar | 8 |
| Water | 200 |

TABLE 15

Sensory Evaluation of Meat Sauce

| Evaluation Items | Average Rating of Inventive |
|---|---|
| Strength of Retort Odor | −0.83* |
| Overall Preference of Aroma | +1.00 |
| Overall Preference of Flavor | +0.8* |

*Significant differences existed with a significance level of not higher than 5%.

<Evaluation criteria>
Rating  +2: Strong or preferable
       +1: Rather strong or rather preferable
        0: Non-different
       −1: Rather weak or rather non-preferable
       −2: Weak or non-preferable As can be understood from Table 15, according to the present embodiment, the retort odor was alleviated, and the aroma and flavor were improved as a whole.

Finally, Examples will be given concerning the sixth embodiment of the present invention.

EXAMPLE 32

Synthesis of 2-(1,2,3,4-Tetrahydroxy-Butyl) Thiazolidine-4-Carboxylic acid

Example 1 was repeated to obtain 2-(1,2,3,4-tetrahydroxybutyl) thiazolidine-4-carboxylic acid.

EXAMPLE 33

Sensory Evaluation of Soybean Protein

The non-volatile thiazolidine compound obtained in Example 32 was added to an aqueous 5% soybean protein solution prepared by adding 19 g of water per 1 gram of soybean protein "AJIPRON HP" (product of Ajinomoto Co., Inc.) in such amount that the concentration of the compound would be 100 ppm at the time of eating, and the resulting solution was heated at 100° C. for 1 hour for the purpose of enhancing the effect of suppressing the unpleasant odor. Sensory evaluations were made on this aqueous soybean protein solution (product according to the present embodiment) and an aqueous soybean protein solution (control product) prepared in the same manner except that the non-volatile thiazolidine compound was not added, by a panel of five experts for the evaluation items shown in the following Table 16 in accordance with the evaluation criteria attached to the same Table. Incidentally, overall evaluation was made in the following manner. That is, the evaluation was made on a scale of 1 to 10 when the rate of the control product was 5. The results are also shown in the same Table as the averages for each evalution item. As can be understood from Table 16, the product according to the present embodiment containing the non-volatile thiazolidine compound (Inventive) had a significantly improved preference as compared with the product containing none of the non-volatile thiazolidine compound (Control).

TABLE 16

Sensory Evaluation of Soybean Protein

| Evaluation Items | Average Rating of Inventive |
|---|---|
| Strength of Weed-like Aroma | −1.40** |
| Overall Preference of Aroma | +0.80 |
| Overall Strength of Flavor | −0.40 |
| Overall Preference of Flavor | +0.60 |
| Overall Evaluation (0 to 10) | 6.20* |

*Significant differences existed with a significance level of not higher than 5%.
**Significant differences existed with a significance level of not higher than 1%.

<Evaluation criteria>
Rating  +2: Strong or preferable
       +1: Rather strong or rather preferable
        0: Same as the control
       −1: Rather weak or rather non-preferable
       −2: Weak or non-preferable

EXAMPLE 34

Sensory Evaluation of Soybean Protein-Incorporated Hamburger System (Part 1)

The non-volatile thiazolidine compound obtained by Example 32 was added to 250 g of the ingredients of a hamburger which were mixed in accordance with the recipe shown in the following Table 17 in such amount that the concentration of the compound would be 500 ppm at the time of eating. The ingredients were mixed well and divided into 50 g portions. Each 50 g portion of the mixture was formed into a round shape and pan-fried. Sensory Evaluations were made by a panel of five experts in accordance with the evaluation criteria attached to the above Table 16. As a result, as is shown in the following Table 18, the hamburger containing the non-volatile thiazolidine compound (Inventive) had a significantly improved preference than the hamburger containing none of the non-volatile thiazolidine compound (Control).

TABLE 17

Recipe of Soybean Protein-Incorporated Hamburger

| Ingredients | Blending Ratio (g) |
|---|---|
| Mixed Ground Meat (Beef and Pork) | 580 |
| Soybean Protein "AJIPRON HP" | 21 |
| Onion | 240 |
| Bread Crumb | 60 |
| Water | 120 |
| Egg | 60 |
| Table Salt | 7.6 |
| Pepper | 0.84 |

TABLE 18

Sensory Evaluation of Soybean Protein-incorporated Hamburger (Part 1)

| Evaluation Items | Average Rating of Inventive |
|---|---|
| Strength of Aroma | 0.00 |
| Preference of Aroma | +0.20 |
| Strength of Flavor of Soybean Protein | −0.40 |
| Strength of Flavor of Meat | +0.40 |

TABLE 18-continued

Sensory Evaluation of Soybean
Protein-incorporated Hamburger (Part 1)

| Evaluation Items | Average Rating of Inventive |
|---|---|
| Overall Preference of Flavor | +0.40 |
| Overall Evaluation (0 to 10) | 5.20 |

EXAMPLE 35

Sensory Evaluation of Soybean
Protein-Incorporated Hamburger System (Part 2)

The non-volatile thiazolidine compound obtained in Example 32 was added to 250 g of the ingredients of a hamburger which were mixed in accordance with the recipe shown in the above Table 17 in such amount that the concentration of the compound would be 500 ppm at the time of eating, and MFT-Cys was also added to the ingredients of the hamburger in such amount that the concentration thereof would be 200 ppb at the time of eating for the purposes of alleviating the soybean odor and enhancing the meat-like aroma. The ingredients were mixed well, and divided into 50 g portions. Each 50 g portion of the mixture was formed into a round shape and pan-fried (product according to the present embodiment). Further, for the sake of comparison, a hamburger was prepared in the same manner except that neither the non-volatile thiazolidine compound nor MFT-Cys was added (control product). The product according to the present embodiment was compared with the control product and evaluated in the same manner as in Example 33. As a result, as is shown in the following Table 19, the hamburger containing both the non-volatile thiazolidine compound and MFT-Cys (Inventive) had a significantly improved preference than the hamburger containing neither the non-volatile thiazolidine compound nor MFT-Cys (Control).

TABLE 19

Sensory Evaluation of Soybean
Protein-incorporated Hamburger Part 2

| Evaluation Items | Average Rating of Inventive |
|---|---|
| Overall Strength of Aroma | +1.20** |
| Overall Preference of Aroma | +1.00* |
| Strength of Flavor of Soybean Protein | −0.60 |
| Strength of Flavor of Meat | +1.20** |
| Overall Preference of Flavor | +0.80* |
| Overall Evaluation (0 to 10) | 6.60** |

*Significant differences existed with a significance level of not higher than 5%.
**Significant differences existed with a significance level of not higher than 1%.

EXAMPLE 36

Sensory Evaluation of Soybean
Protein-Incorporated Hamburger System (Part 3)

The non-volatile thiazolidine compound obtained in Example 32 was added to 250 g of the ingredients of a hamburger which were mixed in accordance with the recipe shown in the above Table 17 in such amount that the concentration of the compound would be 500 ppm at the time of eating, and a commercial reaction flavor "AROMATE MB" (product of Ajinomoto Co., Inc.) was also added to the ingredients of the hamburger in such amount that the concentration thereof would be 250 ppm at the time of eating for the purposes of alleviating the soybean odor and enhancing the meat-like aroma. The ingredients were mixed well, and divided into 50 g portions. Each 50 g portion of the mixture was formed into a round shape and pan-fried (product according to the present embodiment). Further, for the sake of comparison, a hamburger was prepared in the same manner except that neither the non-volatile thiazolidine compound nor AROMATE MB was added (control product). The product according to the present embodiment was compared and evaluated in the same manner as in Example 33. As a result, as is shown in the following Table 20, the hamburger containing both the non-volatile thiazolidine compound and AROMATE MB (Inventive) had a significantly improved preference than the hamburger containing neither the non-volatile thiazolidine compound nor AROMATE MB (Control).

TABLE 20

Sensory Evaluation of Soybean
Protein-incorporated Hamburger (Part 3)

| Evaluation Items | Average Rating of Inventive |
|---|---|
| Overall Strength of Aroma | +1.40** |
| Overall Preference of Aroma | +1.60* |
| Strength of Flavor of Soybean Protein | −1.00 |
| Strength of Flavor of Meat | +1.20* |
| Overall Preference of Flavor | +01.40* |
| Overall Evaluation (0 to 10) | 7.00* |

*Significant differences existed with a significance level of not higher than 5%.
**Significant differences existed with a significance level of not higher than 1%.

INDUSTRIAL APPLICABILITY

According to the present invention, there can be easily provided an excellent composition which can be used in the field of foods and drinks and the like and can retain and develop flavors effectively.

Further, according to the present invention, the unpleasant odor of retort foods can be easily suppressed by using a non-volatile thiazolidine compound alone or using a non-molatile flavor compound and/or a reaction flavor concurrently with a non-molatile thiazolidine compound, and, in turn, there can be easily provided retort foods whose flavor has been improved.

Moreover, according to the present invention, the unpleasant odor of soybean-invorporated food products (soybean-utilized food products) can be easily suppressed by using a non-volatile thiazolidine compound alone or using a non-molatile flavor compound and/or a reaction flavor concurrently with a non-molatile thiazolidine compound, and, in turn, there can be easily provided soybean-utilized food products whose flavor has been improved.

The invention claimed is:

1. A composition for retaining and developing the flavor of a food or drink, comprising:
a non-volatile thiazolidine compound present in an amount effective for retaining and developing the flavor of a food or drink;
wherein said non-volatile thiazolidine compound is at least one compound selected from the group consisting of compounds having a structure in which a polyhydroxyalkyl group derivative having 3 to 11 carbon atoms is bonded to the 2-position carbon atom of thiazolidine-4-carboxylic acid.

2. The composition for retaining and developing the flavor of a food or drink of claim 1, further comprising:

in addition to said non-volatile thiazolidine compound, a non-volatile flavor compound and/or a reaction flavor, said non-volatile flavor compound being obtained by disulfide bonding of an aromatic thiol as volatile flavor compound with a non-volatile thiol.

3. The composition for retaining and developing the flavor of a food or drink of claim 2, which comprises said non-volatile thiazolidine compound and said non-volatile flavor compound and/or said reaction flavor at a ratio of 1–1,000 ppm to 1–1,000.

4. The composition for retaining and developing the flavor of a food or drink of claim 1, wherein said non-volatile thiazolidine compound is one compound selected from the group consisting of 2-(1,2,3-trihydroxypropyl) thiazolidine-4-carboxylic acid, 2-(1,2,3,4-tetrahydroxybutyl) thiazolidine-4-carboxylic acid, 2-(1,2,3,4,5-pentahydroxypentyl) thiazolidine-4-carboxylic acid, 2-hydroxymethyl-2-(1,2,3,4-tetrahydroxybutyl) thiazolidine-4-carboxylic acid, 2-(1,2,4,5-tetrahydroxy-3-glucopyranosyloxypentyl) thiazolidine-4-carboxylic acid, 2-(1,2,3,4-tetrahydroxybutyl) thiazolidine-4-carbonyl-N-glycine and 2-(1,2,3,4,5-pentahydroxypentyl) thiazolidine-4-carbonyl-N-glycine, or a mixture of two or more thereof.

5. The composition for retaining and developing the flavor of a food or drink of claim 1, which comprises said non-volatile thiazolidine compound in an amount of at least 1 ppm in terms of the dry basis of the composition. ppb at the time of eating or drinking.

6. A method for producing a food or drink, comprising: adding the composition of claim 1 to said food or drink.

7. A food or drink which has been produced by the method of claim 6.

8. A composition for retaining and developing the flavor of a food or drink, comprising:

non-volatile thiazolidine compound present in an amount effective for retaining and developing the flavor of a food or drink, which is an organic compound represented by the following general formula (2), or salts thereof

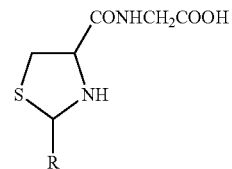

(2)

in which R is a group having the same structure as that of
(i) the residual group obtained by removing an oxygen atom from the aldehyde group of an aldose or aldose-type oligosaccharide, or that of
(ii) the residual group obtained by removing an oxygen atom from the carbonyl group of a ketose or ketose-type oligosaccharide.

9. A composition for retaining and developing the flavor of a food or drink, comprising:

a non-volatile thiazolidine compound present in an amount effective for retaining and developing the flavor of said food or drink;

a non-volatile flavor compound and/or a reaction flavor, said non-volatile flavor compound being obtained by disulfide bonding of an aromatic thiol as volatile flavor compound with a non-volatile thiol, wherein said non-volatile thiazolidine compound is a compound selected from the group consisting of 2-(1,2,3-trihydroxypropyl) thiazolidine-4-carboxylic acid, 2-(1,2,3,4-tetrahydroxybutyl) thiazolidine-4-carboxylic acid, 2-(1,2,3,4,5-pentahydroxypentyl) thiazolidine4-carboxylic acid, 2-hydroxymethyl-2-(1,2,3,4-tetrahydroxybutyl) thiazolidine-4-carboxylic acid, 2-(1,2,4,5-tetrahydroxy-3-glucopyranosyloxypentyl) thiazolidine-4-carboxylic acid, 2-(1,2,3,4-tetrahydroxybutyl) thiazolidine-4-carbonyl-N-glycine, 2-(1,2,3,4,5-pentahydroxypentyl) thiazolidine-4-carbonyl-N-glycine, and mixtures thereof; and wherein said composition comprises said non-volatile thiazolidine compound and said non-volatile flavor compound and/or said reaction flavor at a ratio of 1–1,000 ppm to 1–1,000 ppb at the time of eating or drinking said food or drink.

* * * * *

UNITED STATES PATENT AND TRADEMARK OFFICE
CERTIFICATE OF CORRECTION

PATENT NO. : 7,211,285 B2
APPLICATION NO. : 10/344409
DATED : May 1, 2007
INVENTOR(S) : Hirokazu Kawaguchi et al.

It is certified that error appears in the above-identified patent and that said Letters Patent is hereby corrected as shown below:

Column 3, line 65, " an sufficient amount " should read -- a sufficient amount --.

Column 5, line 18, " Chemistry and organism, "
   should read -- Chemistry and Organism, --;
line 27, " peculiar. to soybeans " should read -- peculiar to soybeans --.

Column 8, line 62, " th-iazolidine compounds "
   should read -- thiazolidine compounds --.

Column 13, line 32, " oligosacohride, or a ketose or a ketose-type oligosacoharide "
   should read -- oligosaccharide, or a ketose or a ketose-type oligosaccharide --.

Column 15, lines 9-10, " pancake (sha-mai), and the like; "
   should read -- pancake (shao-mai), and the like; --;
line 50, " limited as the desired "
   should read -- limited as long as the desired --;
line 54, " it is a amount of " should read -- it is an amount of --.

Column 17, line 7, " franthiol crysteine disulfide) "
   should read -- franthiol cysteine disulfide) --.

Column 18, line 40, " (Electron Spray Ionization-Mass. Spectrometry) "
   should read -- (Electron Spray Ionization-Mass Spectrometry) --.

Column 22, line 8, " Use for Instant-Coffee "
   should read -- Use for Instant Coffee --.

Column 28, line 26, "MFT-Cys abtained by " should read -- MFT-Cys obtained by --.
line 65, " FFT-Cys abtained by " should read -- FFT-Cys obtained by --.

Column 29, line 14, " the thiazokicine compound "
   should read -- the thiazolidine compound --.

UNITED STATES PATENT AND TRADEMARK OFFICE
CERTIFICATE OF CORRECTION

PATENT NO. : 7,211,285 B2
APPLICATION NO. : 10/344409
DATED : May 1, 2007
INVENTOR(S) : Hirokazu Kawaguchi et al.

It is certified that error appears in the above-identified patent and that said Letters Patent is hereby corrected as shown below:

Column 34, line 47, " molatile flavor compound "
       should read -- volatile flavor compound --;
  line 48, " non-molatile thiazolidine compound "
       should read -- non-volatile thiazolidine compound --;
  line 52, " soybean-invorporated food "
       should read -- soybean-incorporated food --;
  line 55, " non-molatile flavor compound "
       should read -- non-volatile flavor compound --;
  line 56, " non-molatile thiazolidine compound "
       should read -- non-volatile thiazolidine compound --.

Column 35, line 16, " ppm to 1-1,000. "
       should read -- ppm to 1-1,000 ppb at the time of eating or drinking. --;
  lines 34-35, " composition. ppb at the time of eating or drinking. "
       should read -- composition. --.

Column 36, line 34, " dine4-carboxylic acid, "
       should read -- dine-4-carboxylic acid, --.

Signed and Sealed this

Eleventh Day of December, 2007

JON W. DUDAS
*Director of the United States Patent and Trademark Office*